(12) United States Patent
Zhang et al.

(10) Patent No.: US 8,812,384 B2
(45) Date of Patent: Aug. 19, 2014

(54) SYSTEMS AND METHODS FOR UNDERLYING ASSET RISK MONITORING FOR INVESTMENT SECURITIES

(75) Inventors: Mingyuan Zhang, Cary, NC (US); Clark Richard Abrahams, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 12/950,153

(22) Filed: Nov. 19, 2010

(65) Prior Publication Data

US 2011/0125671 A1 May 26, 2011

Related U.S. Application Data

(60) Provisional application No. 61/264,096, filed on Nov. 24, 2009.

(51) Int. Cl.
*G06Q 40/00* (2012.01)
(52) U.S. Cl.
USPC .............................. 705/35; 705/36 R; 705/38
(58) Field of Classification Search
CPC ..... G06Q 40/00; G06Q 40/02; G06Q 40/025; G06Q 40/06
USPC .......................................... 705/35–40, 36 R
See application file for complete search history.

(56) References Cited

U.S. PATENT DOCUMENTS

| | | | | |
|---|---|---|---|---|
| 5,197,002 A | * | 3/1993 | Spencer .......................... | 705/34 |
| 6,185,543 B1 | * | 2/2001 | Galperin et al. ................ | 705/38 |
| 7,181,422 B1 | * | 2/2007 | Philip et al. .................. | 705/36 R |
| 7,933,796 B1 | * | 4/2011 | Buist et al. .................... | 705/7.28 |
| 7,962,404 B1 | * | 6/2011 | Metzger et al. .................. | 705/38 |
| 7,987,124 B1 | * | 7/2011 | Holden et al. .................. | 705/35 |
| 8,280,805 B1 | * | 10/2012 | Abrahams et al. ............. | 705/38 |
| 8,423,450 B2 | * | 4/2013 | Oppenheimer et al. ........ | 705/38 |
| 8,498,931 B2 | * | 7/2013 | Abrahams et al. ............. | 705/38 |
| 8,515,862 B2 | * | 8/2013 | Zhang et al. .................... | 705/38 |
| 8,521,631 B2 | * | 8/2013 | Abrahams et al. .......... | 705/36 R |
| 8,639,615 B1 | * | 1/2014 | Neal ............................... | 705/38 |
| 2001/0044766 A1 | * | 11/2001 | Keyes .............................. | 705/36 |
| 2003/0105696 A1 | * | 6/2003 | Kalotay et al. .................. | 705/35 |
| 2005/0197953 A1 | * | 9/2005 | Broadbent et al. ............. | 705/38 |
| 2006/0282359 A1 | | 12/2006 | Nobelli et al. | |
| 2007/0050286 A1 | | 3/2007 | Abrahams et al. | |
| 2007/0055595 A1 | | 3/2007 | Keyes et al. | |
| 2007/0055619 A1 | | 3/2007 | Abrahams et al. | |
| 2007/0208606 A1 | * | 9/2007 | Mackay et al. ................... | 705/9 |
| 2007/0226093 A1 | * | 9/2007 | Chan et al. ..................... | 705/35 |
| 2008/0215481 A1 | * | 9/2008 | Schnall .......................... | 705/38 |
| 2009/0150312 A1 | | 6/2009 | Abrahams et al. | |
| 2009/0299896 A1 | | 12/2009 | Zhang et al. | |
| 2009/0299911 A1 | | 12/2009 | Abrahams et al. | |
| 2010/0211494 A1 | * | 8/2010 | Clements ....................... | 705/37 |
| 2012/0296806 A1 | | 11/2012 | Abrahams et al. | |

* cited by examiner

*Primary Examiner* — Edward Baird
(74) *Attorney, Agent, or Firm* — Kilpatrick Townsend & Stockton LLP

(57) ABSTRACT

Systems and methods are provided for evaluating asset risks using categories of primary loan underwriting factors associated with a pre-selected number of variables. An initial handle-based tree data structure is created based upon primary loan underwriting factors associated with a loan and includes a plurality of handle cells that segment loans according to values of the pre-selected variables. The initial handle-based tree data structure is modified by combining handle cells containing least significant splits and rank ordering of the modified handle-based tree data structure is performed to segment portfolio data.

27 Claims, 20 Drawing Sheets

| RISK RANK | HANDLE NUMBER | CREDIT HISTORY | LOAN TO VALUE RATIO | DEBT TO INCOME RATIO | INCOME | BUREAU SCORE | LOANS | TOTAL NUMBER OF LOANS | % CUMULATIVE LOANS | % DEFAULT | NUMBER OF DEFAULTS |
|---|---|---|---|---|---|---|---|---|---|---|---|
| 1 | 8 | FAIR/POOR | LOW | HIGH | LOW | LOW | 402 | 402 | 5.03 | 80% | 256 |
| 2 | 0 | FAIR/POOR | HIGH | HIGH | LOW | LOW | 656 | 1058 | 13.23 | 77% | 403 |
| 3 | 12 | FAIR/POOR | LOW | HIGH | LOW | HIGH | 328 | 1386 | 17.33 | 72% | 187 |
| 4 | 4 | FAIR/POOR | HIGH | HIGH | LOW | HIGH | 628 | 2014 | 25.18 | 70% | 367 |
| ⋮ | ⋮ | ⋮ | ⋮ | ⋮ | ⋮ | ⋮ | ⋮ | ⋮ | ⋮ | ⋮ | ⋮ |
| 27 | 30 | GOOD | LOW | LOW | LOW | HIGH | 266 | 6499 | 81.24 | 22% | 47 |
| 28 | 23 | GOOD | HIGH | LOW | HIGH | HIGH | 83 | 6582 | 82.28 | 19% | 13 |
| 29 | 31 | GOOD | LOW | LOW | HIGH | HIGH | 717 | 7299 | 91.24 | 18% | 102 |
| 30 | 6 | GOOD | HIGH | HIGH | LOW | HIGH | 325 | 7624 | 95.3 | 18% | 48 |
| 31 | 15 | GOOD | LOW | HIGH | HIGH | HIGH | 204 | 7828 | 97.85 | 15% | 25 |
| 32 | 7 | GOOD | HIGH | HIGH | HIGH | HIGH | 172 | 8000 | 100 | 14% | 18 |

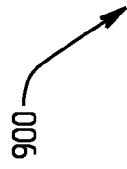

SYSTEMS AND METHODS FOR UNDERLYING ASSET RISK MONITORING FOR INVESTMENT SECURITIES

This application claims priority to U.S. Provisional Patent Application No. 61/264,096 filed Nov. 24, 2009, entitled "Computerized Methods for Underlying Asset Risk Monitoring for Investment Securities." The entirety of which is herein incorporated by reference.

TECHNICAL FIELD

The present disclosure relates generally to securities derivatives and more specifically to securities derivatives data modeling and monitoring.

BACKGROUND

One of the lessons learned from the financial crisis is that rating agencies and investors may desire to understand the underlying loan performance of asset-backed securities in order to evaluate risk and return of those securities. However, current originate-to-distribute business models often disconnect borrowers, lenders, and investors. Loan securitization may further complicate and obscure the monitoring process. As a result, it often is difficult, or impossible for investors to understand how loan performance could impact their investment performance. As disclosed herein, computer-implemented systems and methods are provided that can help rating agencies and investors track loan performance and borrower's affordability and make sound and safe risk assessment and investment decision.

SUMMARY

In accordance with the teachings provided herein, systems and methods are provided for evaluating asset risks using categories of primary loan underwriting factors, which are associated with a pre-selected number of variables. An initial handle-based tree data structure may be created in a computer memory based upon the primary loan underwriting factors associated with a loan, where the initial handle-based tree data structure includes a plurality of handle cells that segment a population of loans according to values of the pre-selected variables. The depth of the initial handle-based tree data structure is the number of variables associated with the primary loan underwriting factors, and a branch of the initial handle-based tree data structure is based on a value of one of the pre-selected variables. The initial handle-based tree data structure may be modified by combining handle cells which contain least significant splits. A rank ordering of the modified handle-based tree data structure may be performed, and the rank ordered handle-based tree data structure may be used to segment portfolio data.

As another example, a system for evaluating asset risks using categories of primary loan underwriting factors, which are associated with a pre-selected number of variables, may include a data processor and a computer-readable memory encoded with instructions for commanding the data processor to execute a method. In the method, an initial handle-based tree data structure may be created in a computer memory based upon the primary loan underwriting factors associated with a loan, where the initial handle-based tree data structure includes a plurality of handle cells that segment a population of loans according to values of the pre-selected variables. The depth of the initial handle-based tree data structure is the number of variables associated with the primary loan underwriting factors, and a branch of the initial handle-based tree data structure is based on a value of one of the pre-selected variables. The initial handle-based tree data structure may be modified by combining handle cells which contain least significant splits. A rank ordering of the modified handle-based tree data structure may be performed, and the rank ordered handle-based tree data structure may be used to segment portfolio data.

As a further example, a computer-readable memory may be encoded with instructions for commanding a data processor to execute a method for evaluating asset risks using categories of primary loan underwriting factors, which are associated with a pre-selected number of variables. In the method, an initial handle-based tree data structure may be created in a computer memory based upon the primary loan underwriting factors associated with a loan, where the initial handle-based tree data structure includes a plurality of handle cells that segment a population of loans according to values of the pre-selected variables. The depth of the initial handle-based tree data structure is the number of variables associated with the primary loan underwriting factors, and a branch of the initial handle-based tree data structure is based on a value of one of the pre-selected variables. The initial handle-based tree data structure may be modified by combining handle cells which contain least significant splits. A rank ordering of the modified handle-based tree data structure may be performed, and the rank ordered handle-based tree data structure may be used to segment portfolio data.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 9 depicts example handle cells sorted according to probability of default.

DETAILED DESCRIPTION

Figure 1:
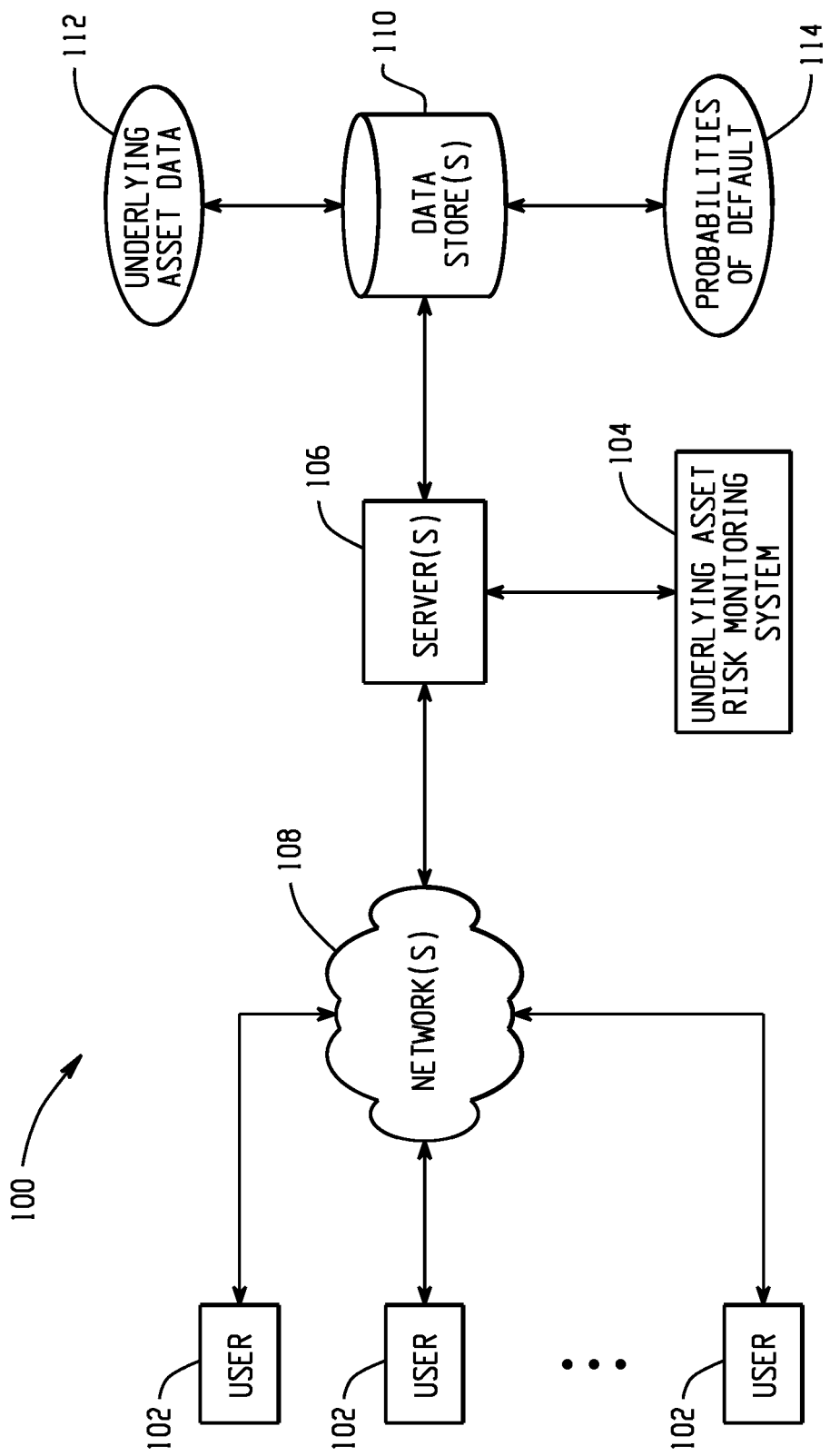
FIG. 1 depicts a computer-implemented environment for monitoring underlying assets of a composite security.

FIG. 1 depicts a computer-implemented environment for monitoring underlying assets of a composite investment. A composite investment is an investment that is a combination of assets, such as securities or other investments. For example, a mutual fund is a composite investment that is made up of a combination of assets such as stocks, bonds, real estate, etc. Other composite investment may contain rights to principal and interest payments on a bundle of loan obligations, such as a mortgage backed security (MBS) or a collateralized debt obligation (CDO). Investors expect a return on their investment based on the risk of loss associated with that investment. Investments with low risk of loss tend to offer small returns, while investments with high risk of loss often offer potential for much larger returns. Thus, the market tends to set prices and yields for investments at levels commensurate with the risk associated with those investments. Generally, investors wish to have information related to the riskiness of an investment at the time of purchase and continue to monitor that riskiness while the investor holds the investment.

A user 102 interacts with an underlying asset risk monitoring system 104 on one or more servers 106 via one or more networks 108. The user 102 may interact with the underlying asset risk monitoring system 104 to perform a variety of functions including segmenting a plurality of investments into levels for bundling into a composite investment. A user may further use the underlying asset risk monitoring system 104 to periodically update analysis on the riskiness of a composite investment to determine if the rate of return remains commensurate with the risk level of the investment.

The users 102 can interact with the underlying asset risk monitoring system 104 in a number of ways, such as over one or more networks 108. For example, server(s) 106 accessible through the network(s) 108 can host the underlying asset risk monitoring system 104. One or more data stores 110 can store data used by the underlying asset risk monitoring system 104 as well as any intermediate or final data generated by the underlying asset risk monitoring system 104. The one or more data stores 110 may contain many different types of data associated with the process including underlying asset data 112, probabilities of default 114, as well as other data. The underlying asset risk monitoring system 104 can be an integrated web-based reporting and analysis tool that provides users flexibility and functionality for creating and analyzing composite investments. It should be understood that the underlying asset risk monitoring system 104 could also be provided on a stand-alone computer connected to the Internet for access by a client computer 102. It should also be understood that the underlying asset risk monitoring system 104 may be utilized with hardware implementations of software such as field-programmable gate arrays.

Figure 2:
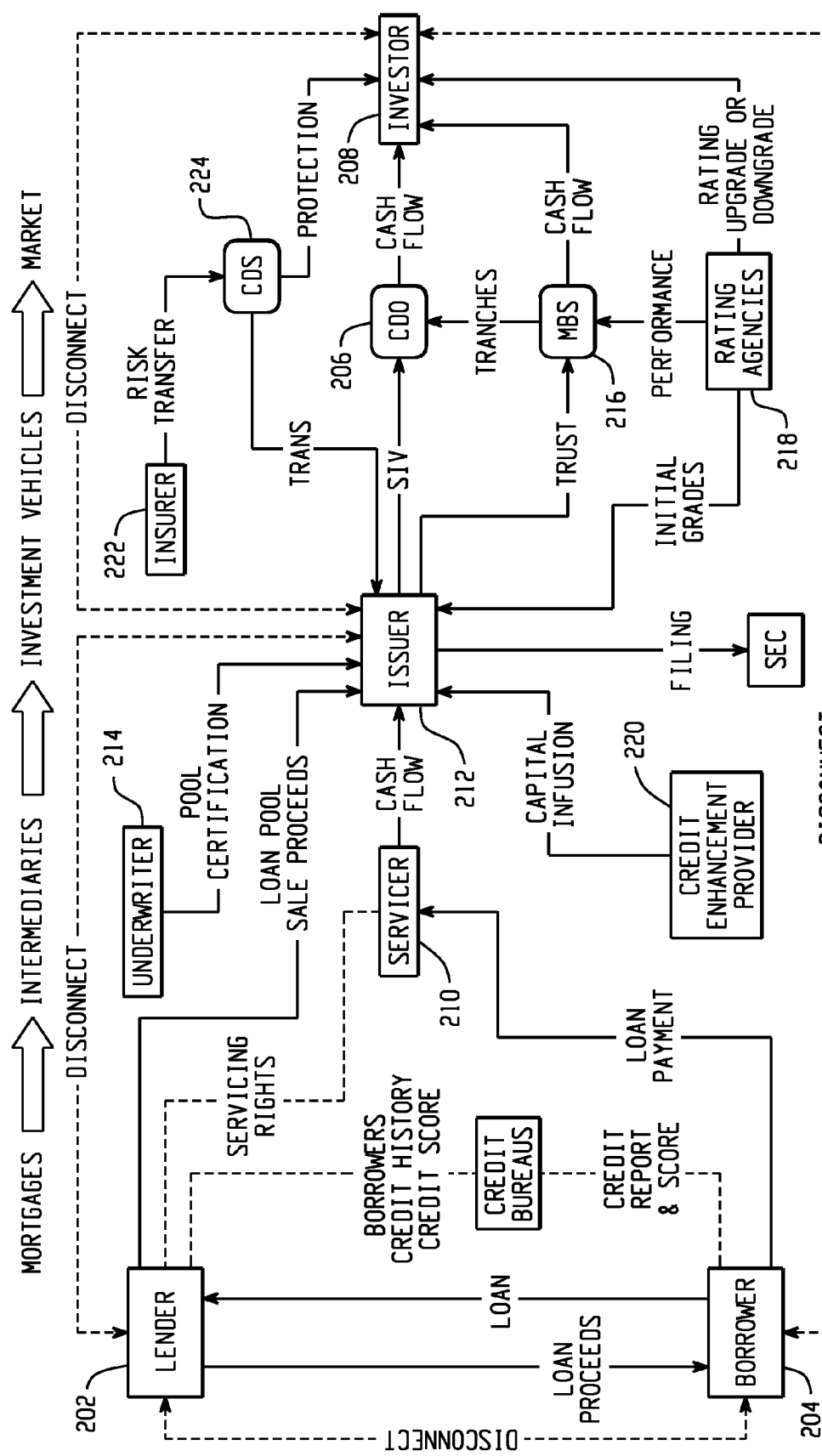
FIG. 2 is a block diagram depicting an example securitization of a set of loan obligations.

FIG. 2 is a block diagram depicting an example securitization of a set of loan obligations. A lender 202 originates loans with borrowers 204 or purchases them from mortgage brokers and transfers them to a special purpose vehicle (SPV), which packages them into collateralized debt obligations (CDO) 206 for sale to investors 208. FIG. 2 depicts a securitization process that is a complicated process that involves parties in addition to the borrower 204, lender 202, and investor 208.

Once the loan is made, the borrower 204 and lender 202 may no longer be directly connected. Instead borrowers 204 may be handed off to a servicer 210, which may be a separate department in a lending institution of the lender 202 or another company entirely in the case of a whole loan sale with servicing released. A mortgage bank can also purchase just the mortgage servicing rights for a securitization (i.e., not the loans themselves) through a bulk acquisition. In that case, the investors 208 already own the underlying mortgages, and the servicing right is considered to be an intangible asset. Mortgage banks can capitalize their cost of purchasing servicing rights based on the expected life of the anticipated revenue stream rather than the contractual maturity.

By the time loans get to the servicing stage, investors 208 may be disconnected from both the mortgage lender 202 and borrower 204 in the sense that they have no access to information relating to the performance of the underlying assets or the credit qualifications of the borrower 204. The process may involve the following players and milestones:

The lenders 202, including institutional retail channels and also wholesale channel brokers who originate subprime mortgage loans. The mortgage broker relationship to borrowers 204 may be severed once the loan is made.

The servicer 210 who collects loan payments from the borrowers 204 and remits them to the issuer 212 for distribution to investors 208 in exchange for a fee. The servicer 210 may also be responsible for handling delinquent loans and foreclosures.

The underwriter 214, typically an investment bank, acts as CDO 206 structurer and arranger. The underwriter 214 structures debt and equity tranches. This includes the purchase of mortgages by investment banks from lenders 202 and pooling them into MBS 216. The trustee holds title to the assets of the CDO 206 for the benefit of the investor 208.

The rating agency 218 rates the securitized assets. The individual bonds within each CDO 206 are classified into different tranches and are given a rating.

A credit enhancer 220 provides contingent capital infusion in the event that credit losses surpass contractual thresholds.

The issuer 212 sells CDOs 206 and MBSs 216 to the investors 208.

An insurer 222 provides tranche insurance by means of the credit default swap (CDS) 224 on MBSs 216 and CDOs 206.

The investor 208 may purchase CDO securities 206 and their protection CDSs 224 from the insurer 222. Higher risk taking investors 208, such as hedge funds, may purchase MBSs 216 to leverage them to borrow money and for trade in other markets.

There are many instances in the processes just described where it is difficult for each participant to evaluate all data related to a composite investment. Some factors that complicate the securitization process are multi-level participants (intermediaries) and a set of conflicts of interest. It is in the securitization process that mortgage loans lose their transparency and information barriers are created. Securitization weakens the traditional relationship between loan originators, borrowers, lenders, issuers, and investors. The transition process contributes to the disconnection between the true quality of the underlying assets and the promised performance of the structured instruments backed by them. These counterparty frictions contribute to the loss of connection and transparency. These frictions are further described below:

Borrower and Lenders.

Traditional mortgage lending created a simple relationship between a borrower and lender. Loan securitization has changed this kind of relationship and has involved more parties in this process. Securitization helps transfer the lender's risk to other parties, such as investors, and provides incentives for the lenders to make more loans in order to meet aggressive targets set forth in master note agreements with government sponsored agencies (i.e., Fannie Mae and Freddie Mac). However, the borrower is often financially unsophisticated, and the lender may have a financial incentive to sell the borrower a loan product that is unsuitable or unaffordable.

Lender and Issuer.

The pool of mortgage loans is typically purchased from the originator by an institution known as the issuer. This process is usually handled by the arranger who performs due diligence in assessing the transaction which includes review of the originator's financial statements, loan pool composition and performance, underwriting guidelines, background checks, and so forth. The issuer is responsible for bringing together all the elements for the deal to close. In particular, the issuer creates a bankruptcy-remote trust that will finalize the purchase details in consultation with the credit rating agencies, file necessary documents with the SEC, and underwrite the issuance of securities by the trust to investors. The issuer is typically compensated through fees charged to investors and through any premium that investors pay on the issued securities over their par value.

Lending institutions pass the majority of the risk associated with their lending operation to the issuer who packages the loans originated by the lender for sale in the secondary market. Oftentimes, subprime lenders who securitized a large portion of their loans and sold them to investment banks did not eliminate all of the risk associated with these loans. They retained a residual portion of the securitized loan pool on their books which left them partially exposed to credit risk. Even in instances where the lenders could transfer most of the risk on to the investors they were still not entirely "off the hook." This is because pool loan performance could result in damage to their reputation, with the attendant consequences (e.g., lower stock price, greater regulatory scrutiny, lower corporate debt rating, and more importantly future securitizations would be jeopardized). That said, securitization often creates a distance between the lenders and investors and potentially reduces lenders' incentives to carefully screen and determine loan affordability.

Issuer and Investor.

The issuer purchases a pool of mortgage loans from the lender or originator. The issuer is supposed to conduct due diligence relative to the lender and the quality of the loan pool. Issuers may have differing views on what constitutes an adequate loan pool due diligence effort. Only too often, historical simulations (e.g., model back-testing), recent performance, and the credit bureau score distribution are the focus. There may be additional segmentation performed by other loan characteristics, such as loan-to value ratio. A complete analysis should include an analysis of future outcomes that are not necessarily reflective of past experience, but nonetheless are feasible, such as a major downturn in the housing market. That analysis should also include a more comprehensive portfolio segmentation scheme that captures all of the relevant factors needed to construct risk-homogenous groups of loans.

Investor and Rating Agencies.

Rating agencies are paid by the issuer and not investors. The investors often lack the ability to evaluate rating agency's models. Most investors simply trust the ratings, despite the fact that they do not understand the basis for them. Many investors do not perform their own analysis.

Figure 3:
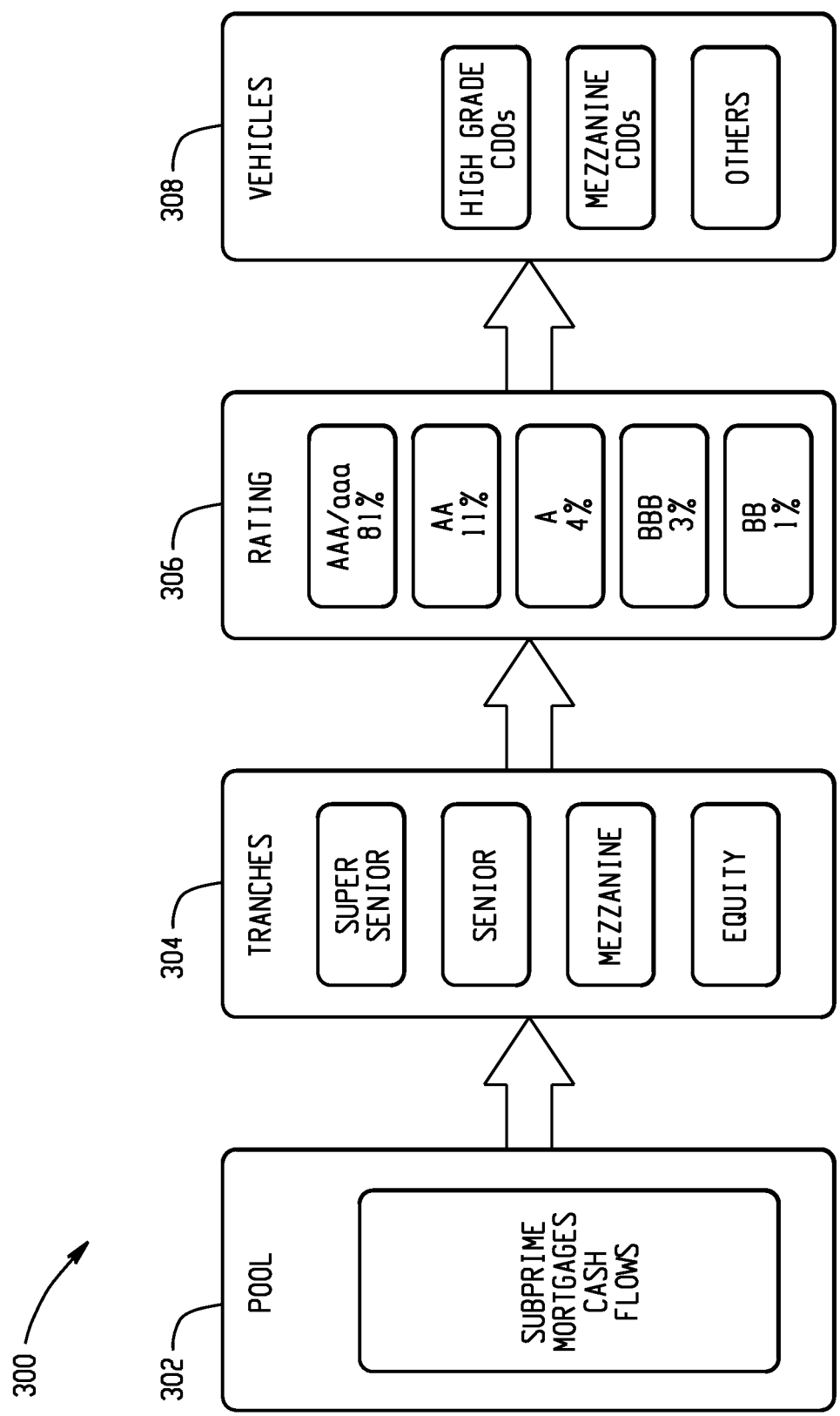
FIG. 3 is a block diagram depicting the progression of mortgage debt obligations to composite investment instruments.

FIG. 3 is a block diagram depicting the progression of mortgage debt obligations to composite investment instruments. Cash flows for individual debt obligations, such as subprime mortgage cash flows 302, are divided into tranches 304. Tranches 304 are a composite investment containing a number of individual investments. For example, a tranche 304 may be a collection of rights to subprime mortgage cash flows from several or many mortgage debt obligations. The tranches 304 may be ranked according to the composite riskiness of the individual investments contained within the tranche 304. For example, less risky tranches may be labeled as super senior while more risky tranches may be labeled as equity. A rating agency provides a rating 306 to each tranche 304 based on the riskiness of the tranche as perceived by the rating agency. Senior tranches often receive high ratings such as AAA, AA, while more risky tranches receive lower ratings such as BB, junk. The rated tranches are made available for purchase by investors as investment vehicles, as noted at 308.

Figure 4:
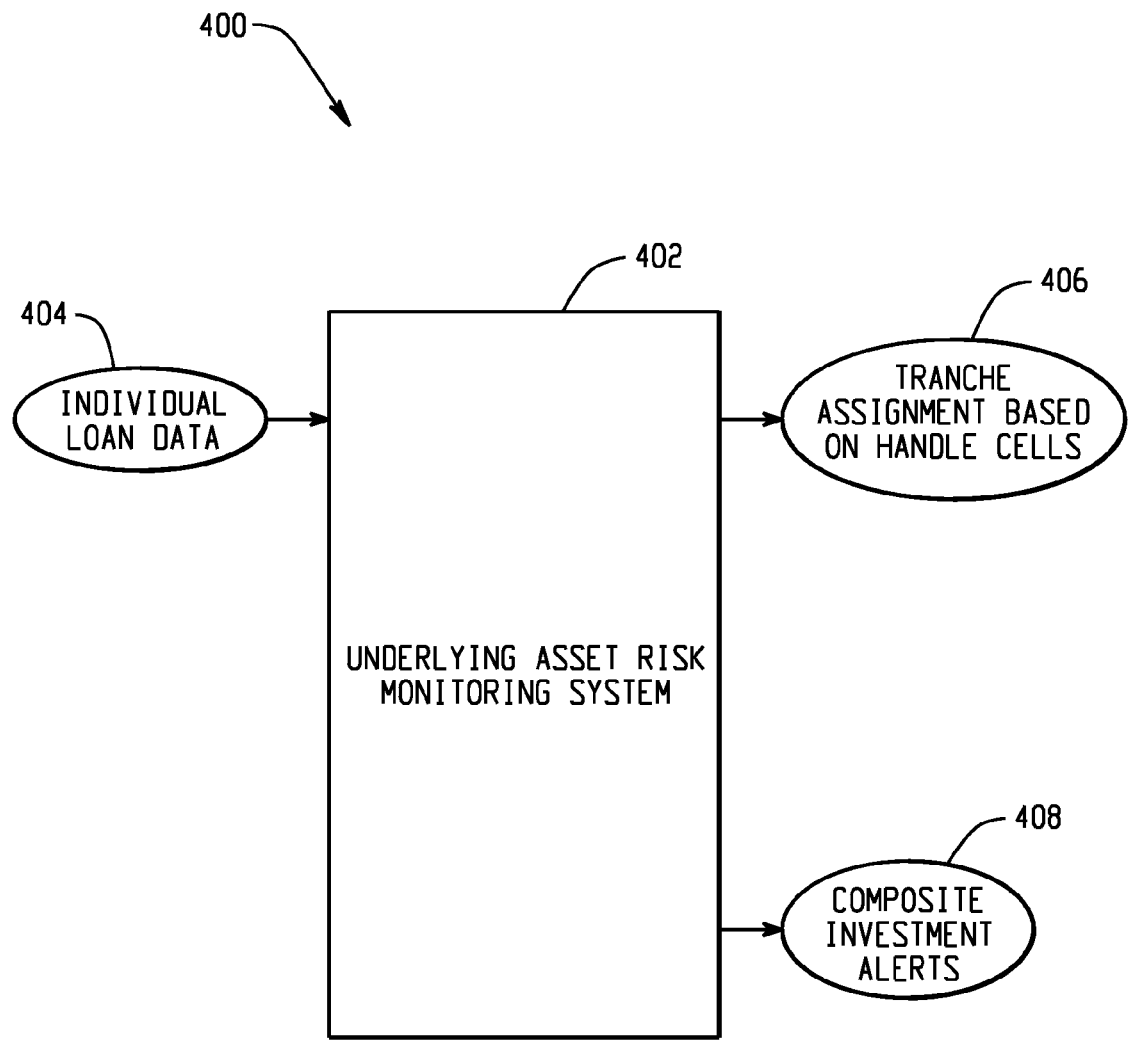
FIG. 4 is a block diagram depicting example inputs and outputs of an underlying asset risk monitoring system.

FIG. 4 is a block diagram depicting example inputs and outputs of an underlying asset risk monitoring system. An underlying asset risk monitoring system 402 receives data 404 related to each of a number of individual investments. For example, the underlying asset risk monitoring system 402 may receive data 404 related to a number of individual loans, whose rights in interest and principal payments may be bundled to form a composite investment. The individual loan data 404 may include a number of different types of data. For example, the individual loan data 404 may include values for a number of variables associated with primary loan underwriting factors.

The primary factors may include a character factor. A character factor may be associated with a recent default variable (e.g., five years), a credit history established variable, a past due performance variable, a credit score, and a stability variable (e.g., years at current job, years at current residence, educational level, insurance level). The primary factors may also include a capacity factor. The capacity factor may be associated with a payment to monthly income ratio (PTI), a debt to income ratio (DTI), an invoice/annual income ratio (IIR), a savings to monthly income ratio (SIR), and an amount of monthly discretionary income variable. The primary factors may also include a capital factor. The capital factor may be associated with an asset to annual income ratio (LIR), a net worth variable, and a months of reserves variable. The primary factors may also include a collateral factor. The collateral factor may be associated with a dealer adds variable, a down payment percentage, an asset age, an asset usage variable, and a loan to value ratio (LTV). The primary factors may also include a conditions factor. The conditions factor may be associated with a loan term, a loan amount, and a vulnerability variable that considers timing and pricing nature of loans outstanding, industry and location of employment, capital asset classes, and volatility of asset prices.

The individual loan data 404 may include values for a number of variables associated with secondary loan underwriting factors. The secondary factors may include whether the loan includes a co-signer, a credit score of an applicable co-signer, and a length of a relationship between a borrower and a lender.

The underlying asset risk monitoring system 402 processes the individual loan data to bin the loans associated with the individual loan data 404 into handle cells. A handle cell contains homogenous loans in terms of default risk. A handle cell definition describes a value or range of values for each of a pre-selected number of variables associated with primary loan underwriting factors. Example handle cell definitions are depicted in FIG. 9, which will be described in further detail herein below. A loan is binned into the handle cell with which the variable values of the loan matches.

A data model may be associated with each of the handle cells. The data model associated with a handle cell may be optimized by adjusting one or more parameters of the data model according to past performance of loans in that handle cell. The data model computes a probability of default for loans in the handle cell. Many different types of data models may be used. For example, a data model may be generated using a regression operation. Models may also utilize Monte Carlo simulation or other mechanisms for computing a probability of default.

Based on the probabilities of default calculated for the handle cells, the underlying asset risk monitoring system may segment the individual loans into tranches to form composite investments 406. For example, a tranche may be desired to contain loans from a single handle cell or a plurality of handle cells having similar calculated probabilities of default. In this manner, a composite investment can be created that contains loan obligations of a similar risk level. A tranche could also be populated based on individual loans from handle cells having differing probabilities of default. For example, 75% of a tranche's loans could be from handle cells having a less than 5% probability of default, and 25% could be from handle cells having a 10% to 25% probability of default.

The underlying asset risk monitoring system 402 may also provide updated analysis to identify changes in risk associated with a composite investment. Such updated analysis may be performed periodically or may be performed after receipt of a user command. Updated analysis by the underlying asset risk monitoring system 402 may include both an updating of assignment of individual loans into handle cells as well as updating of probabilities of default for handle cells themselves.

As to updating assignment of individual loans into handle cells, while a loan may be assigned to a first handle cell at one point in time, shifts in circumstances surrounding the loan may change the handle within which the loan best fits. For example, if, subsequent to the loan being assigned to a first handle cell, a number of incidents are reported that reflect negatively against a borrower's credit rating, then the underlying asset risk monitoring system 402 may reassign the loan to a second handle cell based on the lowered rating. As another example, if the value of collateral for a loan suddenly drops, the underlying asset risk monitoring system 402 may reassign the loan to a second handle based on the lowered value of collateral. An alert 408 may be issued to one or more interested parties when a loan that is an underlying asset to a composite investment is reassigned to a new handle cell. Alerts 408 may also be issued when a threshold number of loans are reassigned to handle cells having higher probabilities of default, when a weighted average of probabilities of default for underlying loans based on calculated handle cell probabilities of default surpasses a threshold, or when other conditions are met.

An underlying asset risk monitoring system 402 may also provide alerts 408 based on updated probabilities of default for handle cells. As noted above, a model is associated with each handle cell. Those models may change over time. For example, a model for a handle cell may be further trained based on subsequent performance of loans assigned to the handle cell. If the rate of default for loans of a given handle cell increase after the initial training of a model, then the calculated probability of default for the handle cell may increase. For example, a sudden change in certain market conditions may result in higher default rates predicted by the model. An alert 408 may be issued when a probability of default for a handle cell containing loans that are part of a composite investment increases, when a weighted average of probabilities of default for underlying loans based on recalculated handle cell probabilities of default surpasses a threshold, or when other conditions are met.

Figure 5:
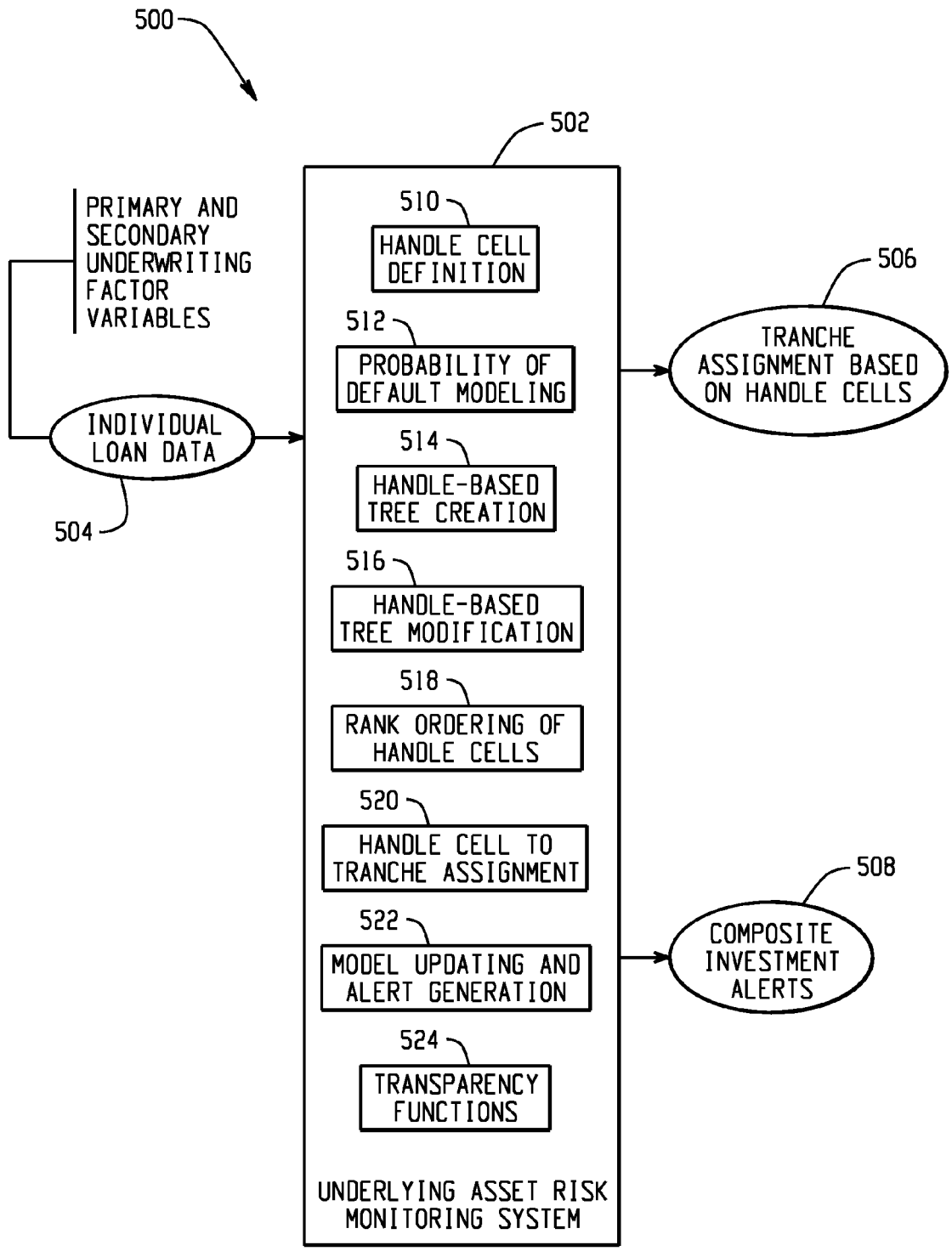
FIG. 5 is a block diagram depicting additional example functions of an underlying asset risk monitoring system.

FIG. 5 is a block diagram depicting additional example functions of an underlying asset risk monitoring system. An underlying asset risk monitoring system 502 receives individual loan data 504 to assign loans to tranches 506 for composite investments and to provide composite investment alerts 508. The underlying asset risk monitoring system 502 may assign the parameters that define a handle cell. For example, a handle cell may contain loans whose borrowers have fair to poor credit history, a high debt to income ratio, low income, a low credit score, where the loan has a low loan to value ratio.

Assignment of handle cell definitions may be provided via a variety of methods, such as a model consensus session (MCS) approach. MCS determines which primary and secondary factors to include in the handle definition, the conditions when to include secondary factors, and the interactions between or among them. In the handle definition development process, variable selection may consider business considerations. For example, credit experts possessing deep knowledge of industry and secondary market models, and also specific experience with the lending institution in question, may form a consensus view in an MCS on primary and secondary variables.

The model consensus session may further involve a choice of algorithms to use for defining handle cell parameters and selection of variables. With respect to variables, variables can be tested for the significance of individual interactions by successively fitting nested models that differ only in one term, namely the interaction of interest. The statistical significance of the individual interaction term can be determined. Variable interactions and thresholds are determined differently based upon the type of model.

Key variables are classified as primary variables, and they may be selected so that each of them measures the unique characteristics of the credit data. For example, credit history captures past willingness and ability to pay obligations as agreed, loan to value ratio (LTV) provides borrower capital and collateral value considerations, and debt to income ratio (DTI) provides borrower capacity and indebtedness information.

Other variables are classified into secondary factors. The variable selection process makes validation of handle cell definition straight-forward. In regression analysis, misspecifications are often related to collinearity, which occurs when two or more input variables are strongly correlated. Collinearity can inflate the variances of the parameter estimates when the analysis involves small and moderate sample sizes. Collinearity may also result in wrong signs and magnitudes of regression coefficient estimates, and consequently in incorrect conclusions about relationships between independent and dependent variables. There are many remedial methods for addressing collinearity, such as Bayesian techniques, robust estimation, and principal component analysis. The MCS approach may minimize misspecifications and reduce the impact of collinearity by incorporating judgmental elements to create and use new variables. In some circumstances, new variables are created to capture the interaction and conditions between/among input variables. In some instances, neither of the variables in question appears in the model. For example, a new interaction variable can be created to capture the degree of risk that is jointly determined by a primary factor and secondary factor.

An underlying asset risk monitoring system 502 may also perform probability of default modeling 512 for each handle cell. As noted above, a model is assigned to each handle cell to calculate a probability of default for loans assigned to that handle cell. The calculated probability of default for a handle cell can be used for assigning loans in that handle cell to tranches for incorporation into composite investments.

An underlying asset risk monitoring system 502 may create a handle-based tree data structure at 514 for analysis of handle cells. A handle based tree data structure may be based on the primary loan underwriting factors associated with loans, as discussed in further detail with respect to FIGS. 11A and 11B. An underlying asset risk monitoring system 502 may further perform handle-based tree modification at 516 on the handle-based tree data structure created at 514. For example, handle-based tree modification 516 may combine handle cells within the tree that have insignificant splits. By combining handle cells, fewer models need to be assigned and maintained for calculating probabilities of default, increasing system performance. Handle-based tree modification is described in further detail with respect to FIGS. 12 and 13, herein below.

Handle cells, such as those stored in a handle-based tree or a modified handle-based tree may be ranked 518 by an underlying asset risk monitoring system 502, such as according to probabilities of default associated with those handle cells/combined handle cells. The ranking may be used for tranche assignment 506. For example, it may be desired to assign loans to a tranche using loans having less than 10% probability of default. After sorting handle cells based on probability of default, those handle cells at the top of the list, having less than a 10% probability of default may be used for populating the tranche. As another example, it may be desired to populate a tranche with loans from the top 20% of least default probability. After sorting the handle cells, loans can be chosen from the top 20% to populate that tranche, as depicted at 520.

The underlying asset risk monitoring system 502 may also perform periodic or on command updating of risk monitoring of underlying assets to provide composite investment alerts 508, as shown at 522. For example, if reassignment of loans to different handle cells or recalibration of models indicates an increased default risk for a composite investment, a composite investment alert 508 may be provided to interested parties such as investors, issuers, servicers, insurers, rating agencies, or others.

An underlying asset risk monitoring system 502 may also provide one or more transparency functions 524 to alleviate some of the gaps in data flow regarding underlying loans and their riskiness. Lack of transparency is traditionally an issue for investors in mortgage-backed securities. Investors were at times at the mercy of the rating agencies to tell them the investment grade of these securities. There was no window into the risks associated with the underlying securities stemming from loan maturity, geography, borrower risk segments, types of mortgage products, and delinquency and prepayment rates.

It may be important to an investor to understand how loans were originally pooled together with any diversification criteria. Investors may want to ensure that any cause for a few of the loans in a pool to default does not correlate to the majority of the remaining loans in the pool. A handle approach offers one advantage in that the "handle" can be leveraged to segment and then combine loans in the pool for the purpose of more accurate loss estimation. The handle structure can help create more homogenous pool of mortgages. A big challenge to valuation of a CDO is the heterogeneity of the loan pool. The handle based segmentation can be used to classify the mortgage pool into more homogenous classes prior to applying predicted default models.

Another concern is an ability to trace loans in investor pools back to their source through a unique identifier, like the nine character CUSIP identifier (CUSIP is an acronym for Committee on Uniform Security Identification Procedures) associated with all North American securities. The identifier may identify loans within a composite security, the originating institution, the loan booking system used, and the original loan number. A transaction contour could also be embedded in the identifier. The power afforded by having the contour in the identifier may be substantial. Pool performance could be monitored at the loan level and improved projections on delinquency, loss, and prepayments may be performed by building separate models based upon the contour segments. Tracking of individual loan identifiers with a composite investment may provide interested parties access to data at macro and micro levels. For example, an investor could query an average debt to value of all loans in a composite investment or could investigate an amount of collateral associated with an individual loan in the composite investment.

Figure 6:
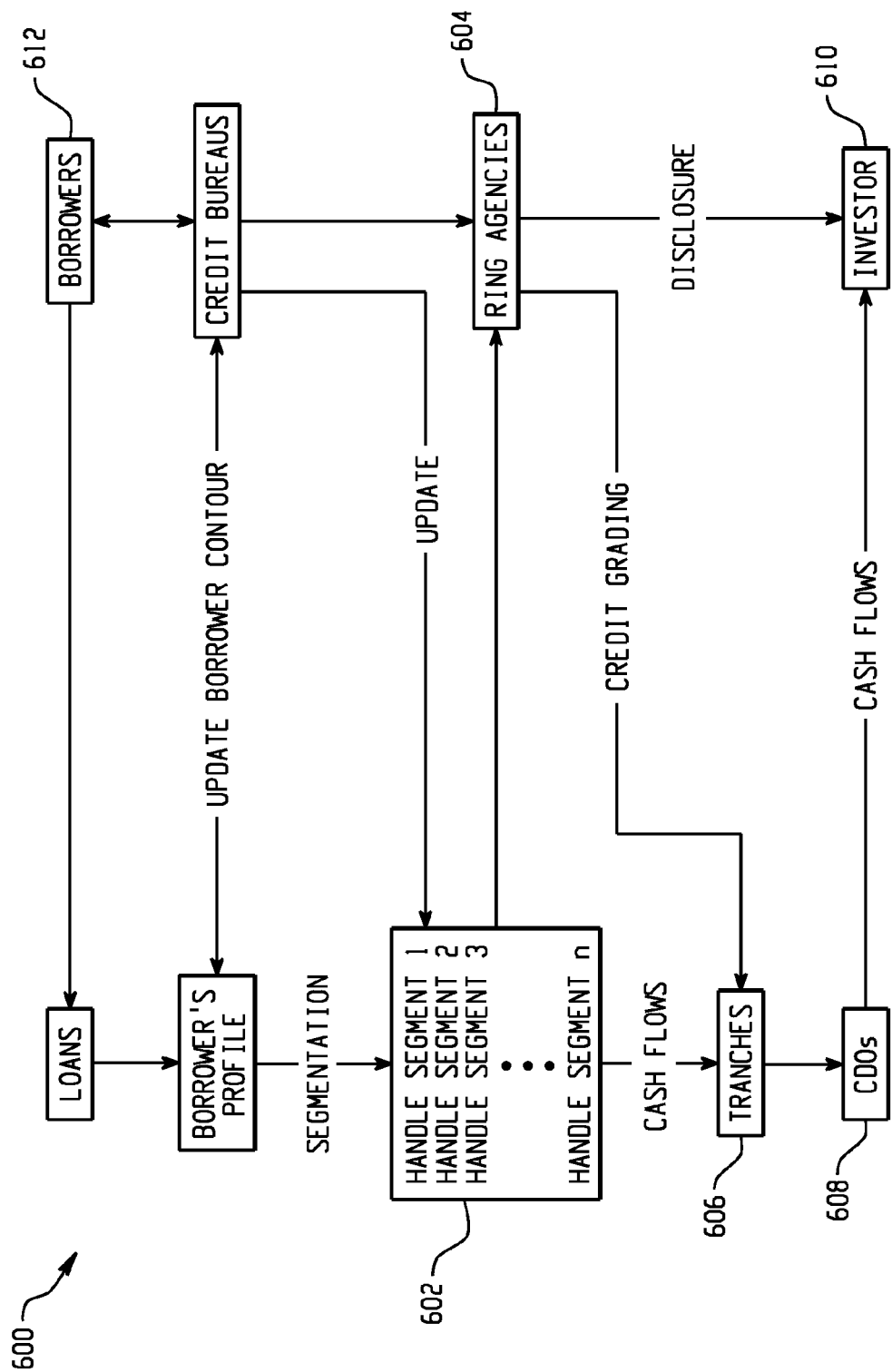
FIG. 6 is a block diagram depicting an example function of an underlying asset risk monitoring system.

FIG. 6 is a block diagram depicting an example function of an underlying asset risk monitoring system. At 602, the handle segmentation classifies all loans into handle-based segments. Each segment contains homogenous loans in terms of default risk. In other words, the handle number associated with each segment implicitly captures the common attributes related to default risk. At 604, rating agencies can use the handle cells, which are all possible combinations of all relevant variables, to create all possible extreme cases for simulation of loss distribution. At 606, tranches are created based on the handle segments, and CDOs 608 are created based on based on concentration risk calculated from the handle segments.

The investors 610 can examine the concentration risk associated with each tranche 606 in a CDO 608. The investors 610 can trace a CDO offering back to the default risk and concentration risk associated with each tranche 606. Changes in the attributes of the underlying mortgage/borrowers 612 can be updated and reported to the investors 610. Any deterioration in loan quality can be identified to give the investors 610 an early warning of increasing risk.

Figure 7:
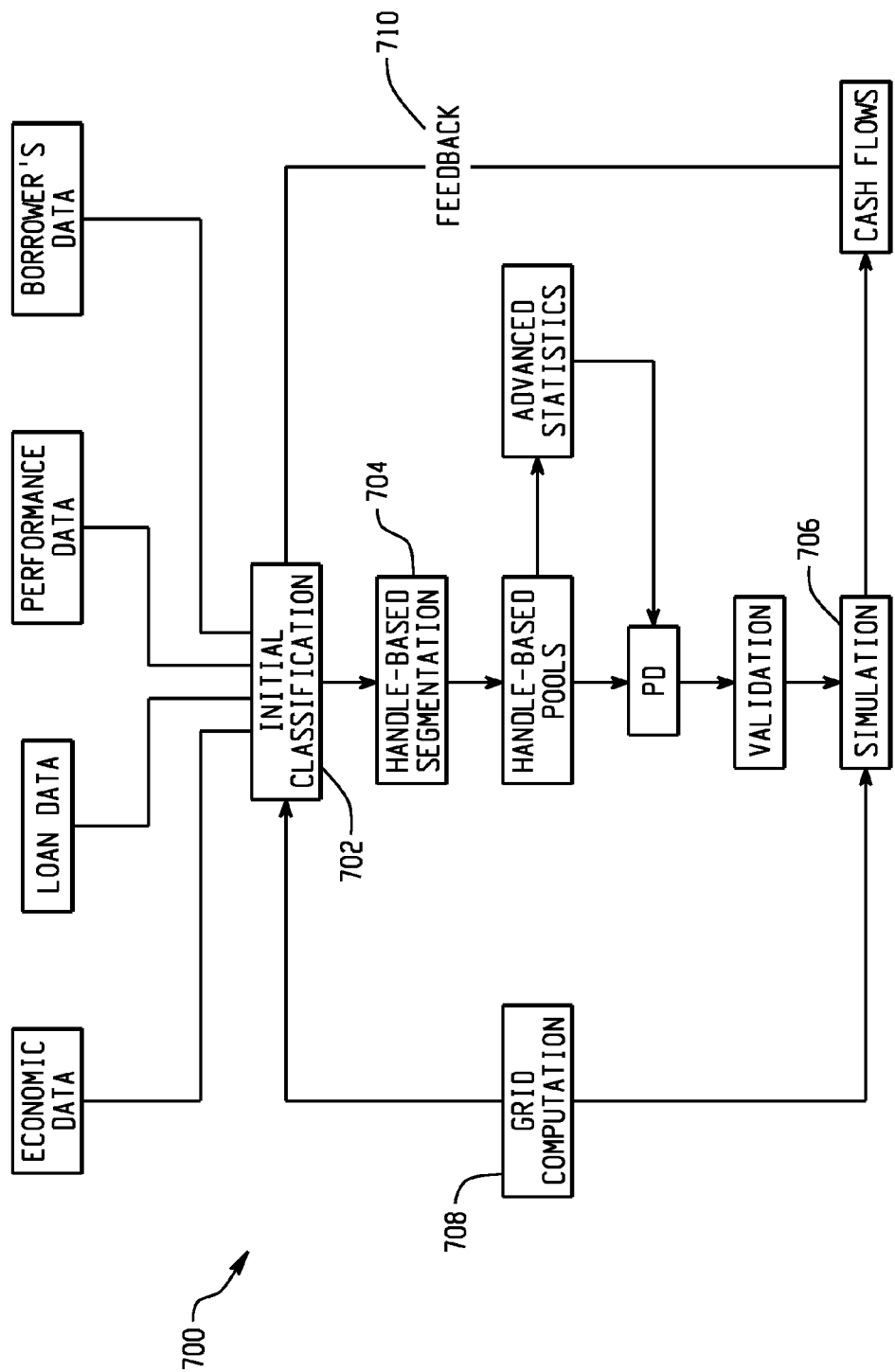
FIG. 7 is a block diagram depicting an example handle based segmentation process.

FIG. 7 is a block diagram depicting an example handle based segmentation process. At 702, mortgage loans are initially classified into handle cells based on borrower's contour (BC) and transaction contour (TC). The BC and TC may be constructed based on selected primary and secondary variables, such as LTV, DTI, credit bureau score, terms and conditions, and so forth such that each handle cell contains homogenous loans in terms of default risk. At 704, loans are segmented into tranches. Tranches may be created based on concentration risk calculated from the handle cells. Tranche size and selection may be based on concentration risk. The probability of default and expected loss for each tranche may be estimated using a dynamic conditional process (DCP). At 706, cash flows may be simulated, such as via a Monte Carlo simulation. A Monte Carlo simulation may be resource intensive. However, grid computing 708 or other techniques may be utilized to mitigate the complexity of the operation.

As shown at 710, a feedback loop may be utilized to implement model maintenance and update. The handle-based structure offers an efficient way to validate, monitor, and report data dynamics and population changes. Effective model management is important as the number of models grows. Previously, rating agencies often were unable to keep their models current, in part, due to insufficient capacity in managing large number of models and growing loan database.

Figure 8:
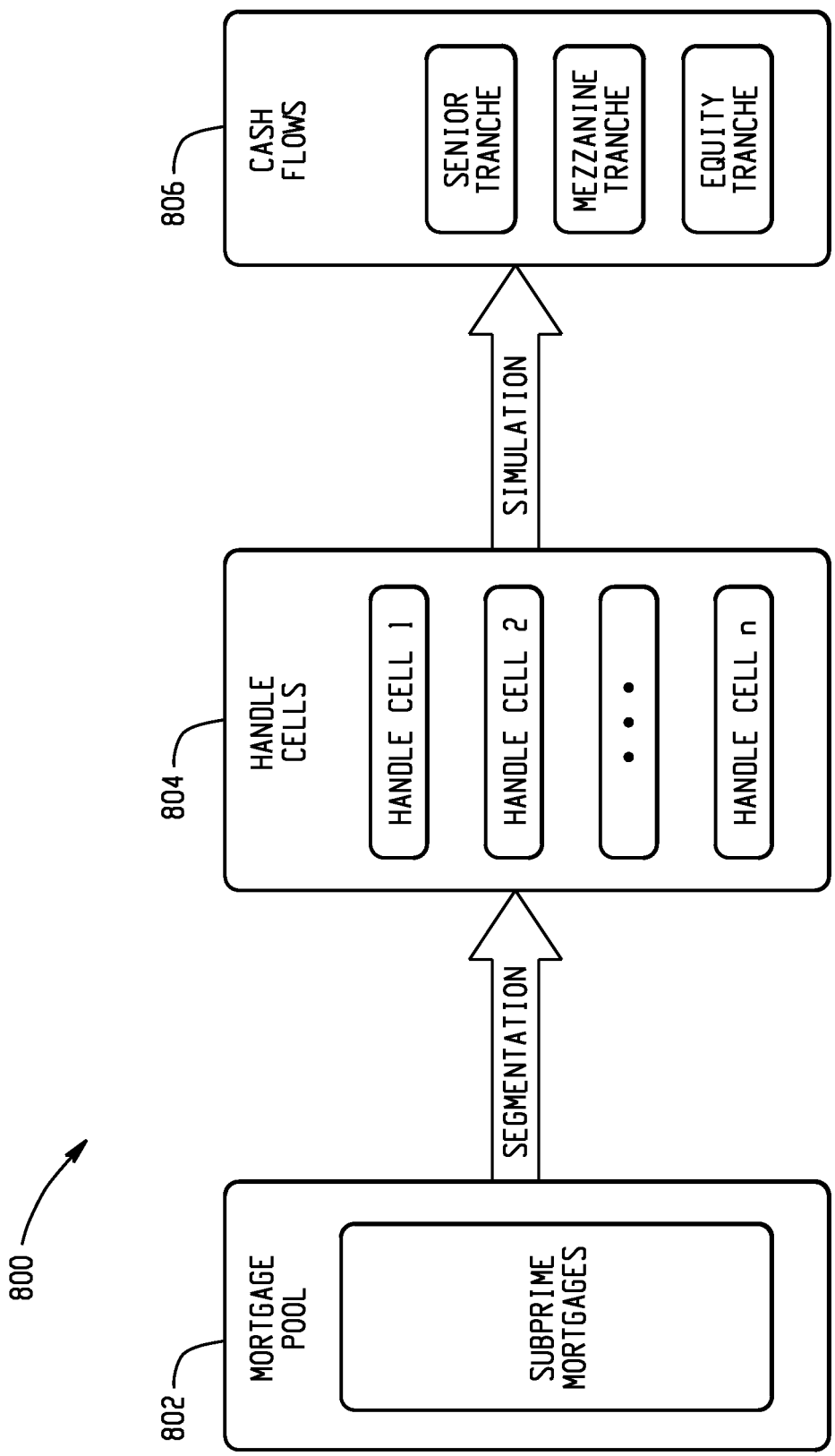
FIG. 8 depicts an example process of assigning loans to tranches using an underlying asset risk monitoring system.

FIG. 8 depicts an example process of assigning loans to tranches using an underlying asset risk monitoring system. Individual mortgages 802 are classified into handle cells 804. The loans 802 may then be segmented into tranches 806 for incorporation into composite investments after certain operations by the underlying asset risk monitoring system.

FIG. 9 depicts example handle cells sorted according to probability of default. The handle cells classify loans according to credit history of the buyer; loan to value ratio of the loan; and debt to income ratio, income, and credit score of the borrower. A model is run for each of the handle cells to calculate a probability of default, and the handle cells are sorted such that handle cells having a highest probability of default are listed at the top of the table.

Figure 10:
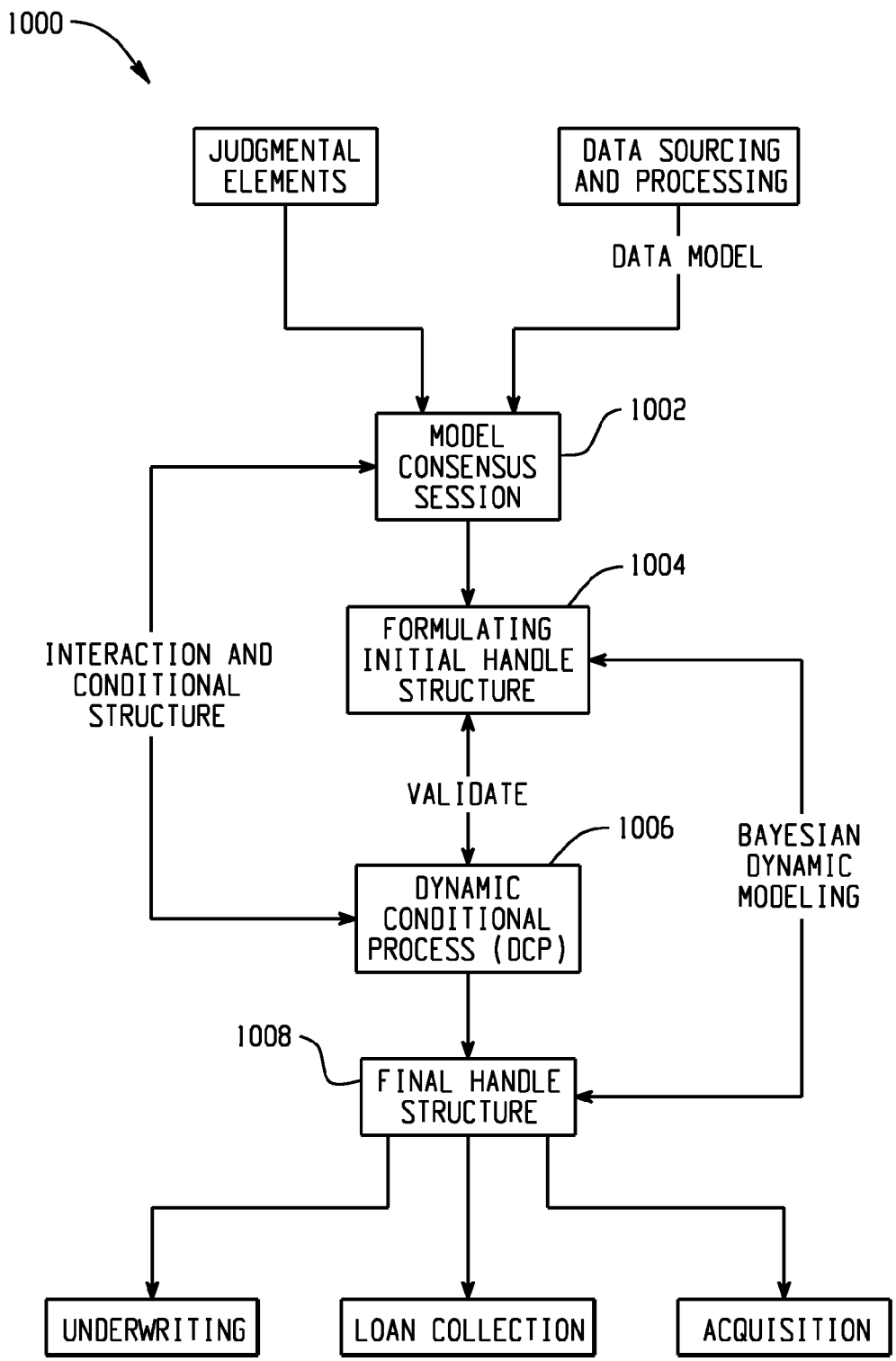
FIG. 10 is a flow diagram depicting a segmentation process classifying a loan portfolio into different groups for risk rating.

FIG. 10 is a flow diagram depicting a segmentation process classifying a loan portfolio into different groups for risk rating. The segmentation process can be assisted with a handle-based tree structure. At 1002, primary loan underwriting factors, which may include variables such as LTV, DTI, credit history, credit bureau score, etc., are identified along with secondary loan underwriting factors, which may include variables such as borrower's years at current address, a number of years a borrower has worked at a profession, bank relation, co-applicant credit score, etc. At 1004, an initial handle-based tree structure is created using the identified primary factors. A handle-based tree structure may have the following features:

- The depth of the tree is the number of primary variables, a branch of the tree may be based on a value of a pre-selected variables associated with a primary variable, and the total number of leaves is equal to the number of handle cells.
- The tree structure may be non-path dependent, such that when a variable enters the tree does not matter. This can avoid a regression issue where some important variables may enter into the model at a later state and are assigned inappropriate weights.
- The tree structure can model all important factors simultaneously where no order needs to be specified.
- The tree structure can provide a holistic view where all scenarios are considered.

Figure 11A:
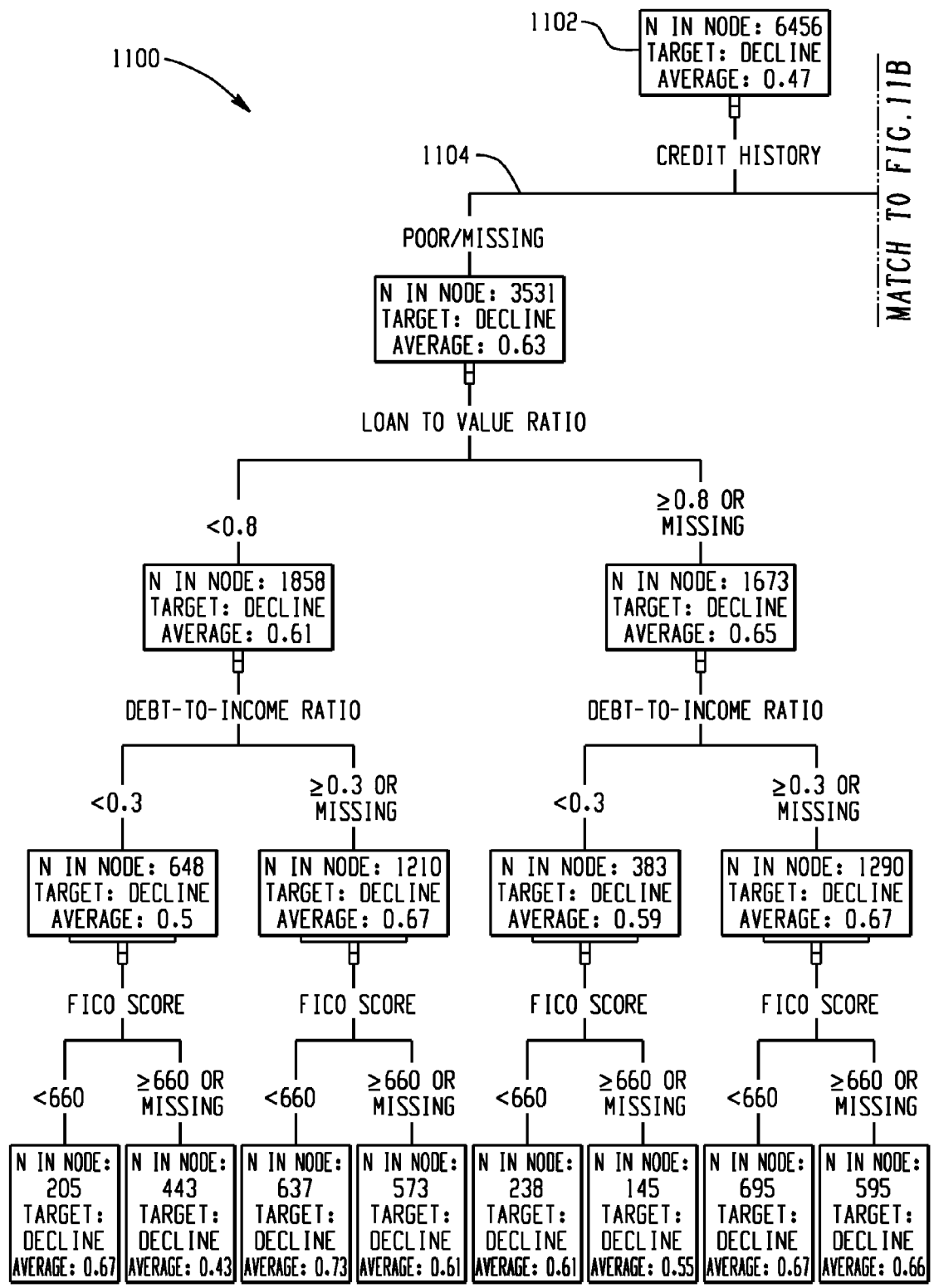
FIG. 11 depicts an example initial handle-based tree structure.
Figure 11B:
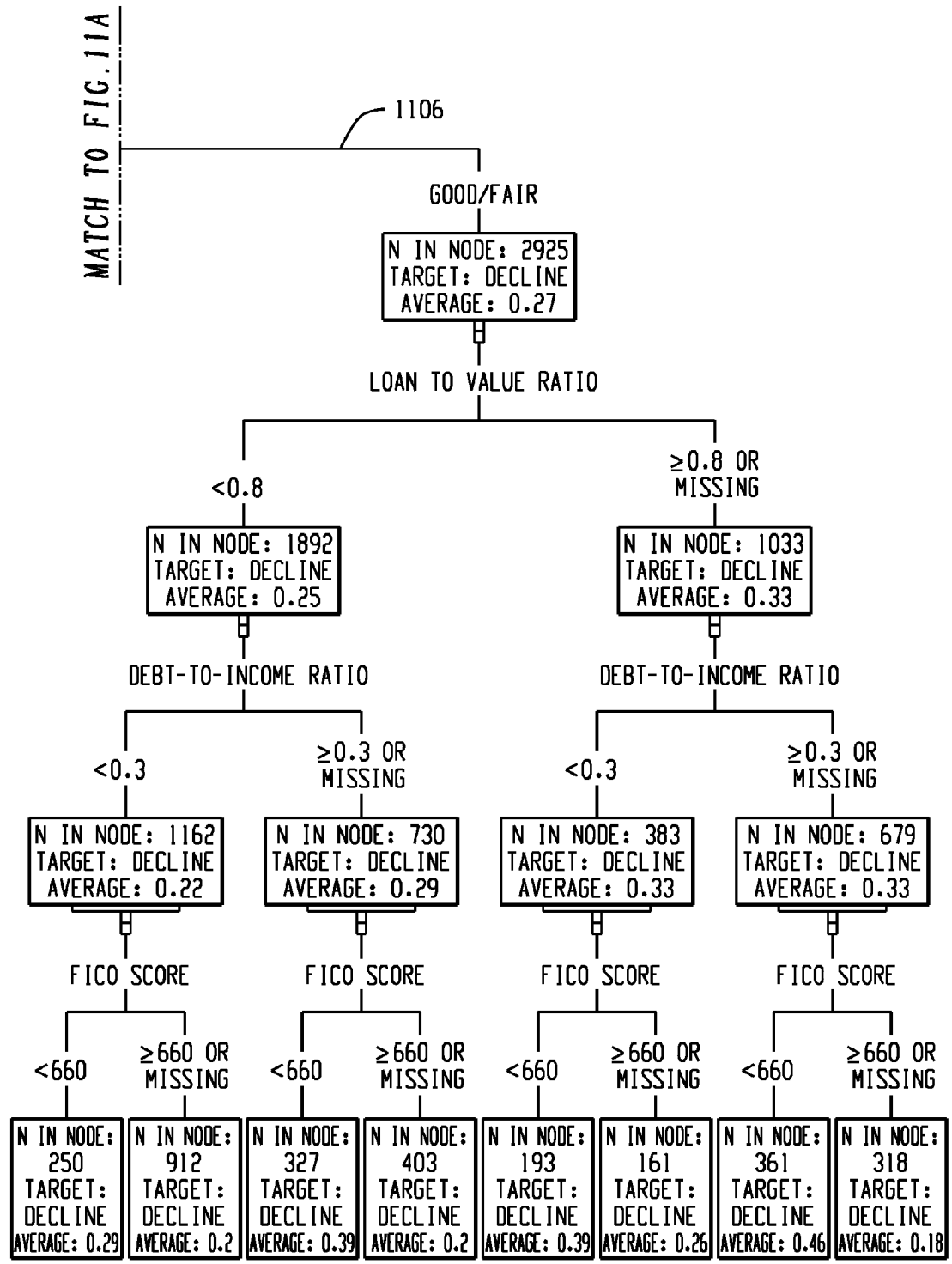

FIGS. 11A and 11B depict an example initial handle-based tree structure. Both CHAID and CART techniques can be used to construct and validate such trees, where each (non-terminal) node identifies a split condition, to yield optimum prediction of continuous dependent or response variables or classification for categorical dependent or response variables. Hence, both types of algorithms can be applied to analyze regression-type problems or classification-type. In this example, the root node 1102 has values: N in Node: 6456, Target: Decline; and Average (probability of default): 0.47. Credit history then provides for the first split, where the left branch 1104 depicts poor or missing, and the right branch 1106 depicts good or fair. The node under the poor or missing branch has values: N in Node 3531; Target: Decline; and Average: 0.63. The other node has values N in Node: 2925, Target: decline; and Average: 0.27. The succeeding splits involve loan-to-value ratio, debt-to-income ratio, and FICO score.

Traditional CHAID techniques rely on a grouping method that divides the respective continuous distributions into a number of categories with an approximately equal number of observations. This is purely statistical driven. The acronym CHAID stands for Chi-squared Automatic Interaction Detector. It is one of the oldest tree classification methods. A CHAID operation will "build" non-binary trees (i.e., trees where more than two branches can attach to a single root or node), based on a relatively simple algorithm that is particularly well suited for the analysis of larger datasets. Also, because the CHAID algorithm will often effectively yield many multi-way frequency tables (e.g., when classifying a categorical response variable with many categories, based on categorical predictors with many classes), it has been particularly popular in marketing research, in the context of market segmentation studies. A CHAID operation may cycle through the predictors to determine for each handle cell that is least significantly different with respect to the dependent variable; for classification problems, where the dependent variable is categorical as well, a CHAID operation may compute a Pearson Chi-square; and for regression problems, where the dependent variable is continuous, F tests. If the respective test for a given pair of predictor categories is not statistically significant as defined by an alpha-to-merge value, then a CHAID operation may merge the respective predictor categories and repeat this step to find the next pair of categories, which now may include previously merged categories. If the statistical significance for the respective pair of predictor categories is significant (e.g., less than the respective alpha-to-merge value), then the CHAID operation may compute a Bonferroni adjusted p-value for the set of categories for the respective predictor.

As an alternative, grouping may be performed by using the initial handle table based on "prior" knowledge (e.g. policy, rules, etc.). This becomes a starting point for splitting and the process continues until the most significant split or threshold for each predictor is identified. This is a "modified CHAID" method based on Bayesian approach.

Figure 12:
FIG. 12 is a table depicting an example of Brier score calculation.

With reference back to FIG. 10, the handle-based tree structure may be further validated and fine tuned with some basic statistical methods including modified CHAID method described above, as shown at 1006. For example, a validation may include a cycling through all handle cells (tree leaves) to determine, for each factor, the pair of categories that is least significantly different with respect to the target variable. In decision tree terminology, all competing rules can be compared with the current split and ranked in terms of Brier score, which is means squared error of probability of default: Brier=$1/N \Sigma(PD-I(default))^2$. One way to estimate probability of default is to use logistic regression. FIG. 12 is a table depicting an example of such Brier score calculation. Such a process may be continued until a minimum discrepancy is achieved.

Figure 13A:
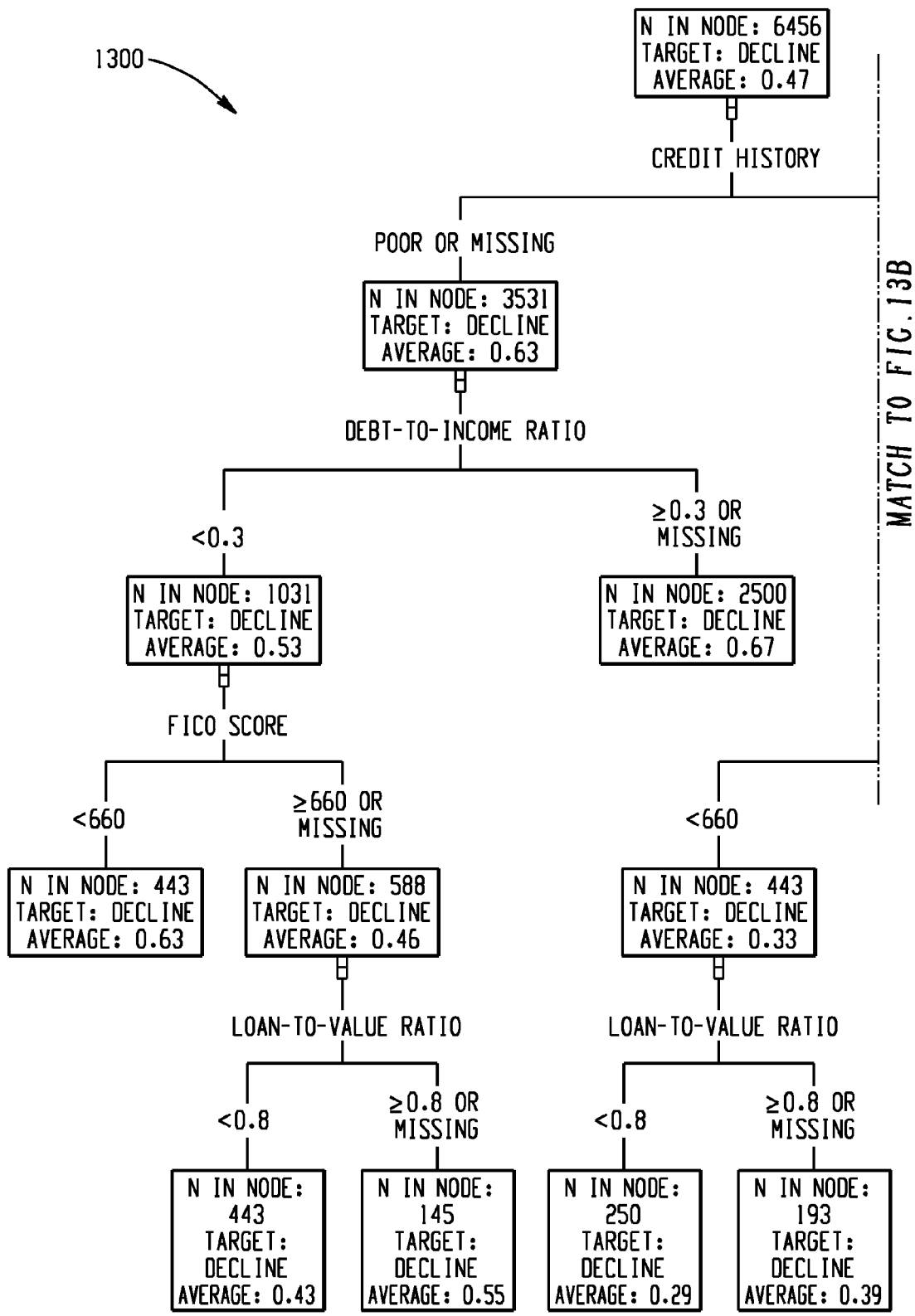
FIG. 13 depicts a final handle structure with ten handle cells.
Figure 13B:
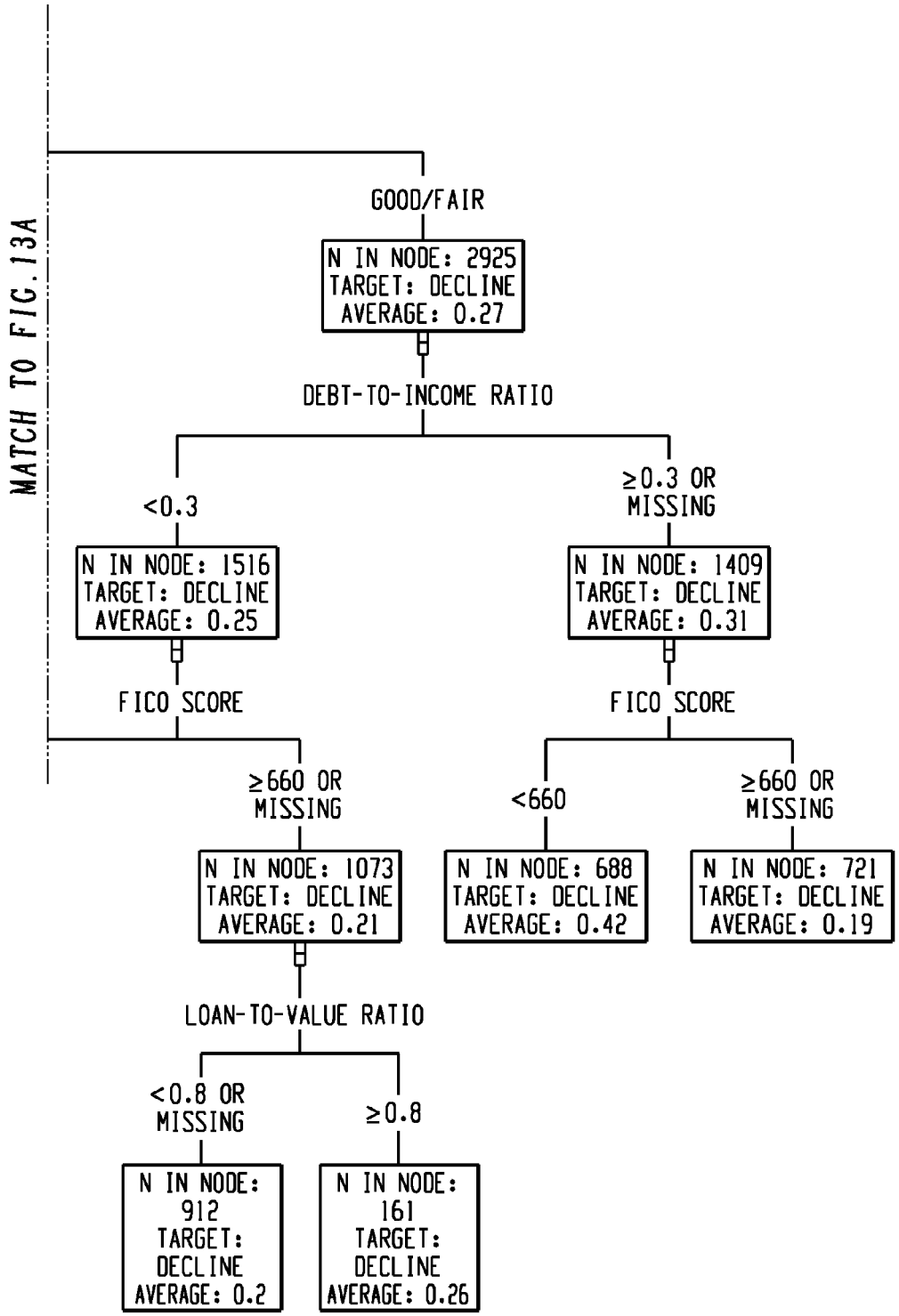

The dynamic conditioning process may continue to combine the handle cells which contain least significant splits to generate a final handle structure 1008. Such an operation may be performed using the results from the previous step, together with secondary factors. This step is may be especially valuable for the handle cells with similar Brier scores but significant split values. FIGS. 13A and 13B depict a final handle structure with ten handle cells (i.e., ten leaves). In the example of FIGS. 13A and 13B, the splits are as follows: credit history, debt-to-income ratio, FICO score, and loan-to-value ratio. As information accumulates over time, combined handle cells may be re-tested and may be split out based pre-determined criterion (such as partition Chi-square at a prescribed confidence level).

Figure 14:
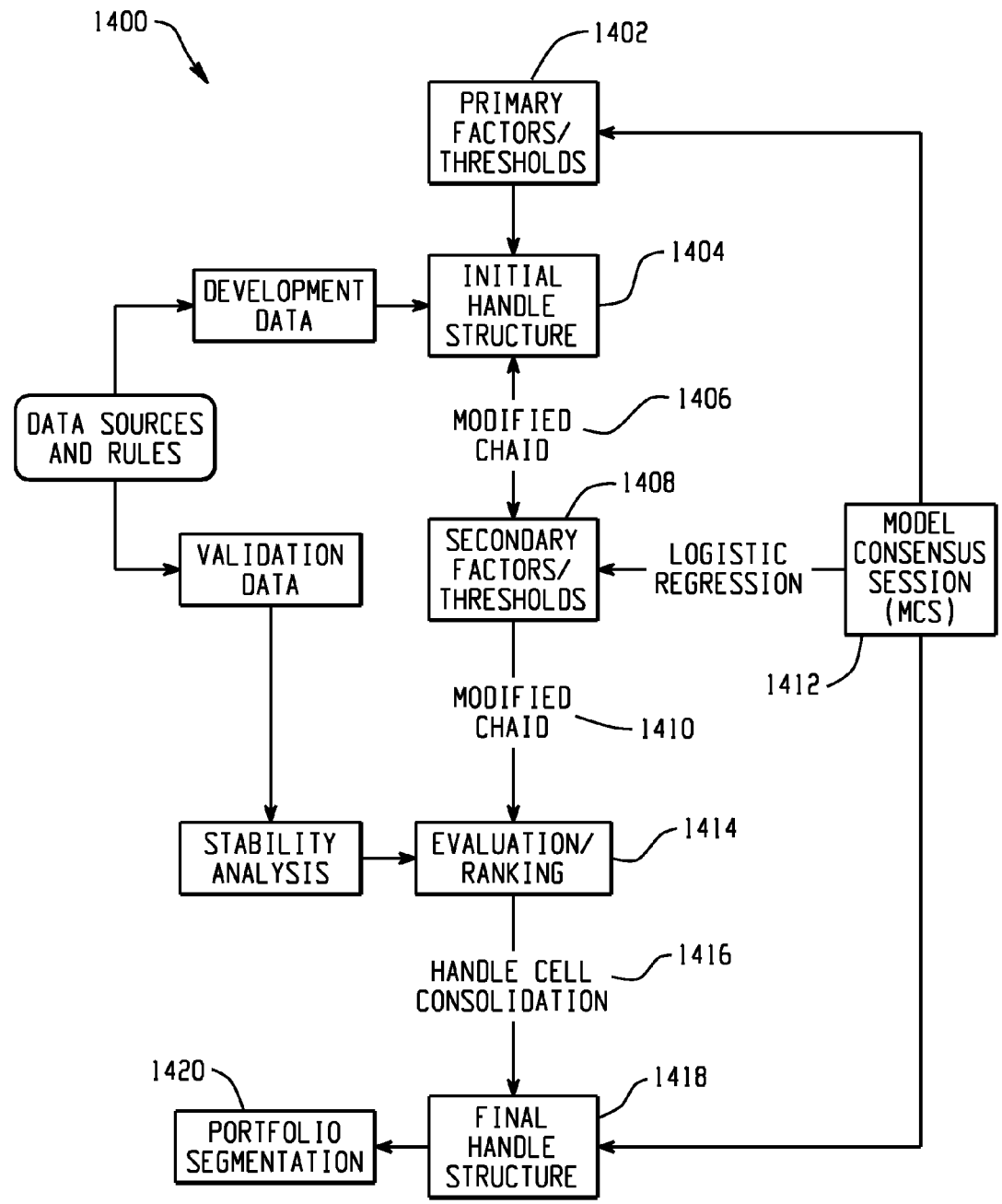
FIG. 14 is a flow diagram depicting a detailed representation of an example modeling process.

FIG. 14 is a flow diagram depicting a detailed representation of an example modeling process. At 1402, initial primary factors and thresholds are determined, such as via a model consensus session. Results from step 1402, together with a development dataset, are used to construct the initial handle table (IHT) at 1404. A modified CHAID method is applied to IHT, at 1406, to validate the handle cells using a set of competing rules to obtain a preliminary rank order of cells. At 1408, secondary factors are introduced to assist and fine tune handle ranking with minimum conditional and interaction terms. At 1410, a CHAID method is used to further validate handle splitting and ranking. Logistic regression models are developed to predict a probability of default for each handle cell, as shown at 1412. At 1414, a predicted probability for each handle cell is compared with the natural default rate, and mean squared error is calculated. Handle cells are consolidated at 1416 based on the ranking results from step 1414, together with predetermined scenarios to generate a final handle structure 1418. Rank order handle cells from results from steps 1414 and 1416 are used to calculate a CCAF score based on handle cell risk distribution and relative ranking. At 1420, the final handle table will be used to score and segment portfolio data.

Figure 15:
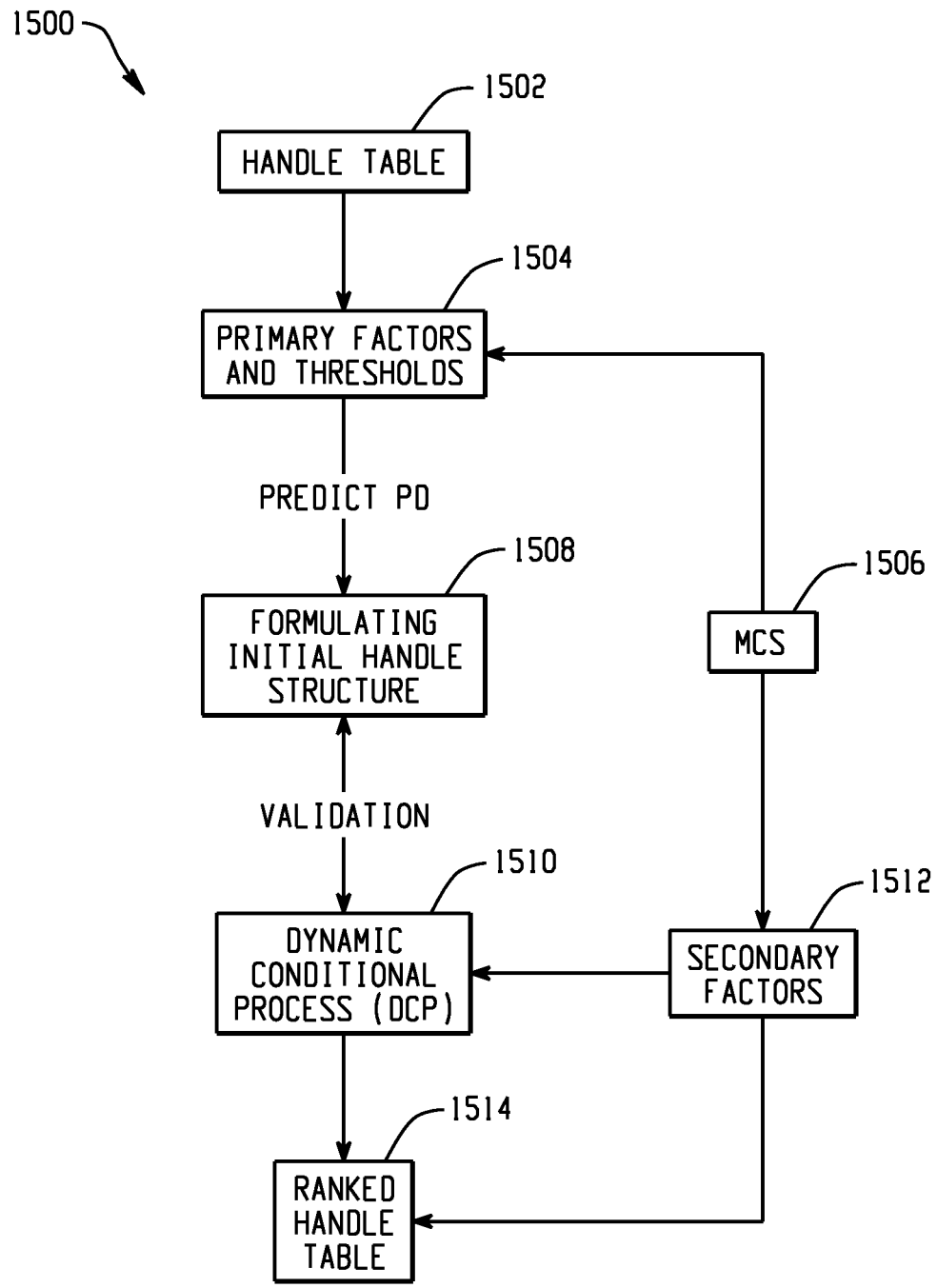
FIG. 15 is a flow diagram depicting an example ranking process.

FIG. 15 is a flow diagram depicting an example ranking process. A handle table is received at 1502. At 1504, primary factors for a handle-based tree data structure and thresholds for the branches of the tree are determined, such as via a model consensus session 1506. Probabilities of default are predicted, and at 1508, an initial handle-based tree data structure is created in a computer memory based upon the primary loan underwriting factors associated with a loan, wherein the initial handle-based tree data structure includes the plurality of handle cells that segment a population of loans according to values of the pre-selected variables, wherein a handle cell is associated with a single parent handle cell one or more children parent handle cells, wherein depth of the initial handle-based tree data structure is the number of variables associated with the primary loan underwriting factors, and wherein a branch of the initial handle-based tree data structure is based on a value of one of the pre-selected variables. At 1510, the initial handle-based tree data structure is modified by combining handle cells which contain least significant splits. The modification may consider secondary factors 1512 that may be selected in the model consensus session 1506. A rank ordering of the modified handle-based tree data structure is performed to generate a rank ordered handle-based table 1514, and the rank ordered handle-based tree data structure is used to segment portfolio data.

Figure 16:
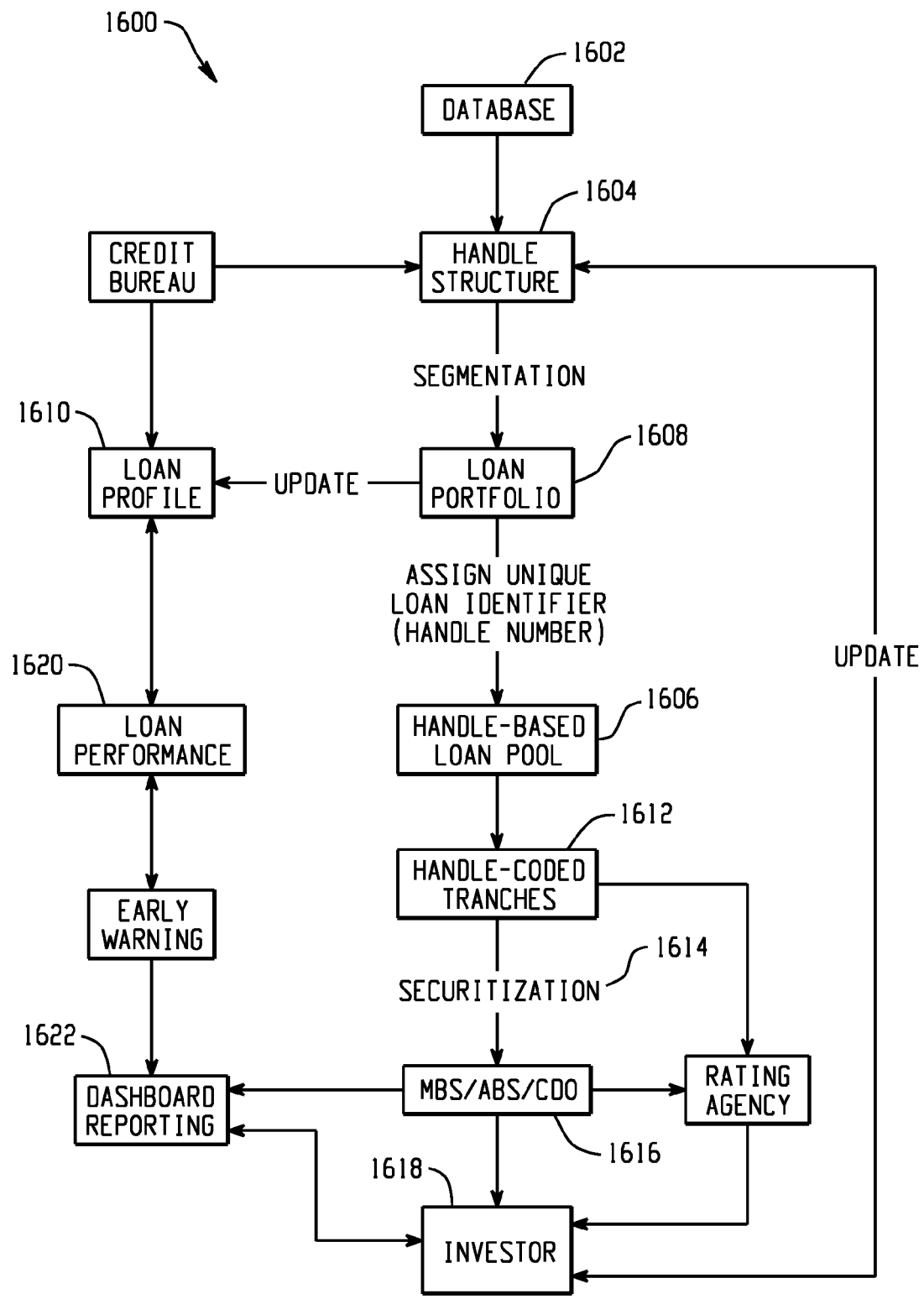
FIG. 16 is a flow diagram depicting an example method for data sourcing and processing.

FIG. 16 is a flow diagram depicting an example method for data sourcing and processing. A database 1602 may contain source data that can include applications, loan performance history, census, economic indicator, demographics. At 1604, a development sample is selected to create the handle structure. A final handle structure is created by updating and fine-tuning with a modified CHAID operation. A handle-based loan pool may be created at 1606 by applying the handle structure to a selected loan portfolio 1608 and assigning each loan an identifier number. Loans in the same handle cell may have the same identifier with same characteristics. At 1610, a loan profile may be created based on handle segmentation, where the loan profile is mapped to each of the handle cells by handle number (risk identifier). The handle-based loan pools may be used to create tranches at 1612, which can be further securitized at 1614 into related structured products 1616 and sold to investors 1618. Each loan or loan slice in a tranche is coded with a handle number and associated with loan profile and monitored for loan performance, as shown at 1620. A loan profile may be updated based on changes in handle ranking and distribution. For example, a risk migration may be predicted for predefined timeframes based on loan profile and performance, together with related information (e.g., economic data, credit bureau, etc.). At 1622 dashboard reports may be produced and associated with the loan portfolio an investor holds. Based on the reports, the investor 1618 can update their investment strategies.

Figure 17A:
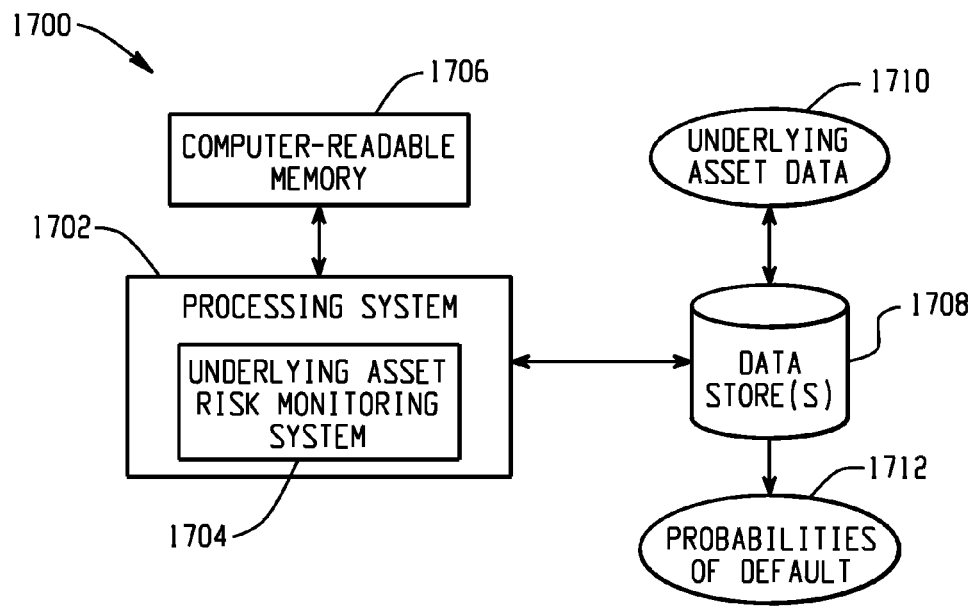
FIGS. 17A, 17B, and 17C depict example systems of an underlying asset risk monitoring system.
Figure 17B:
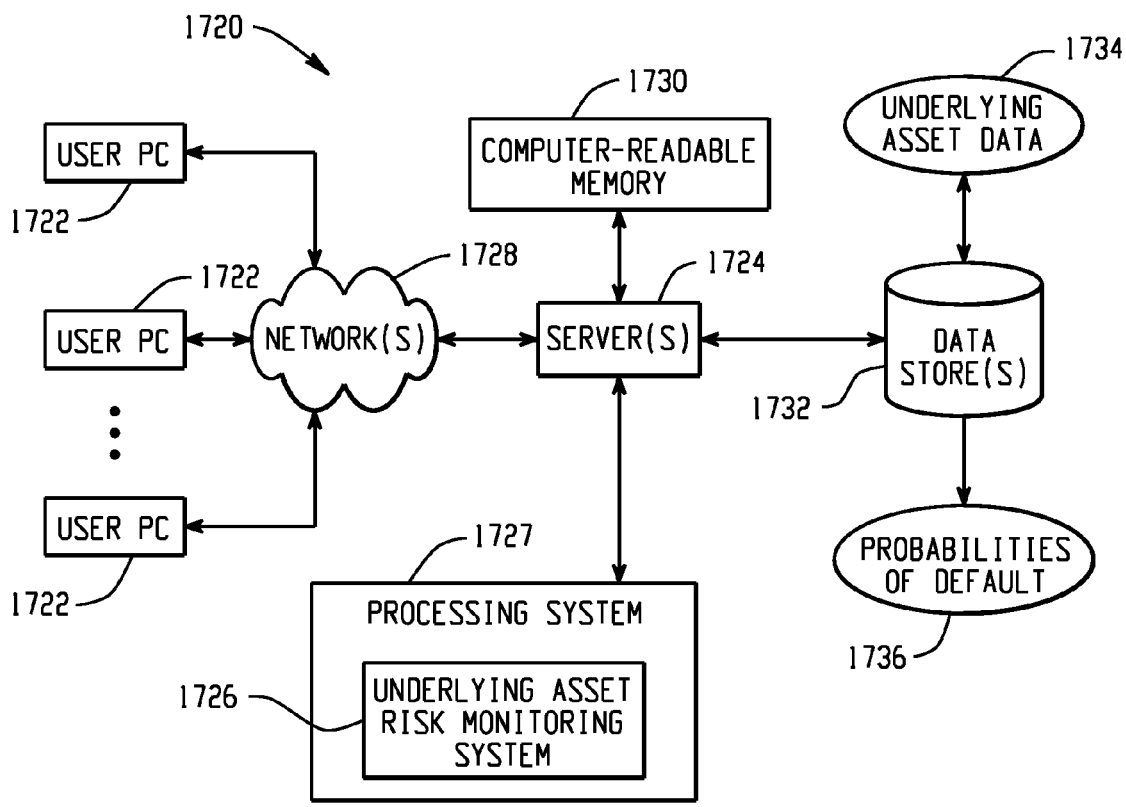
Figure 17C:
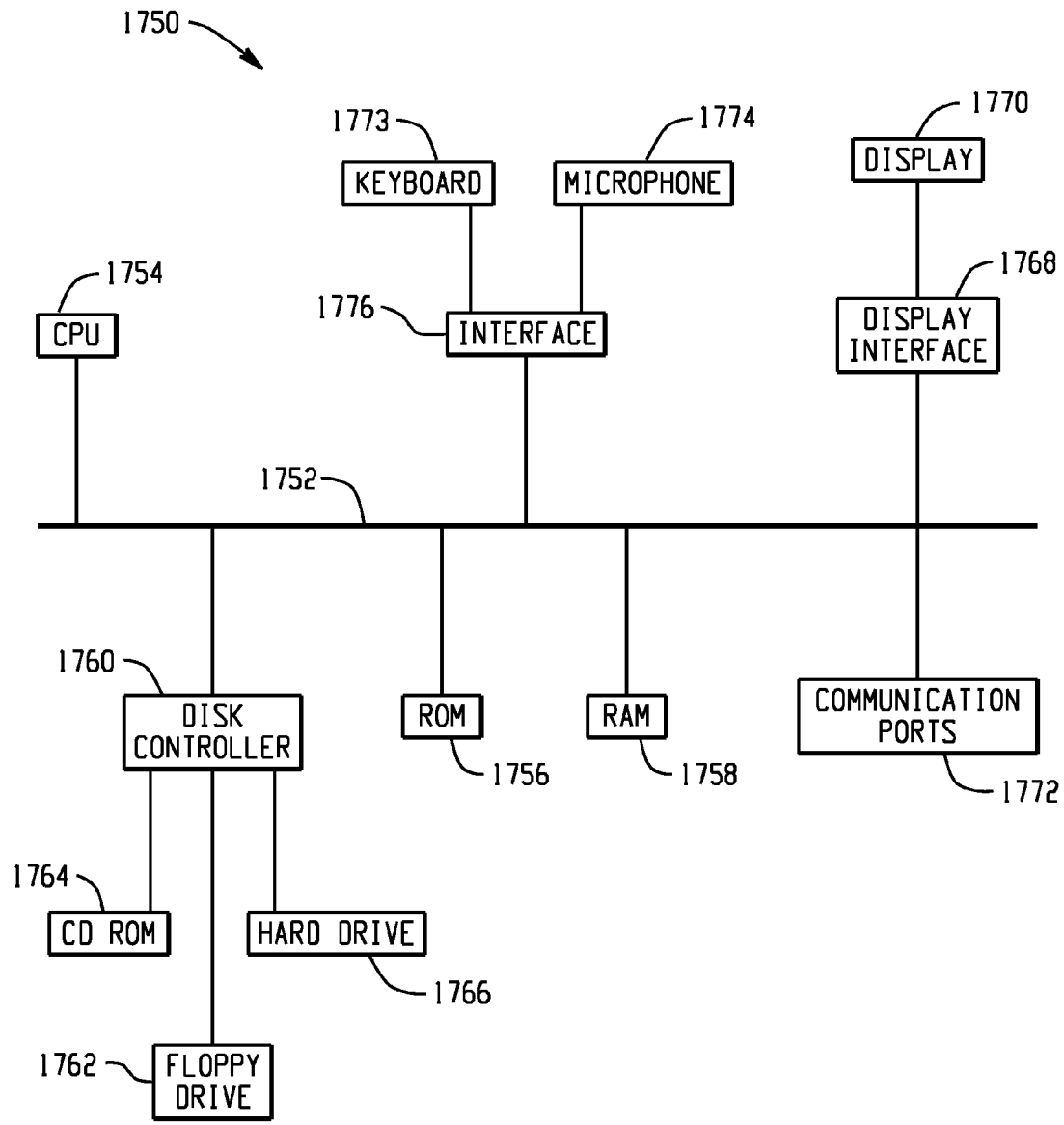

FIGS. 17A, 17B, and 17C depict example systems of an underlying asset risk monitoring system. For example, FIG. 17A depicts an exemplary system 1700 that includes a stand alone computer architecture where a processing system 1702 (e.g., one or more computer processors) includes an underlying asset risk monitoring system 1704 being executed on it. The processing system 1702 has access to a computer-readable memory 1706 in addition to one or more data stores 1708. The one or more data stores 1708 may contain underlying asset data 1710 as well probabilities of default 1712.

FIG. 17B depicts a system 1720 that includes a client server architecture. One or more user PCs 1722 accesses one or more servers 1724 running an underlying asset risk monitoring system 1726 on a processing system 1727 via one or more networks 1728. The one or more servers 1724 may access a computer readable memory 1730 as well as one or more data stores 1732. The one or more data stores 1732 may contain underlying asset data 1734 as well as probabilities of default 1736.

FIG. 17C shows a block diagram of exemplary hardware for a standalone computer architecture 1750, such as the architecture depicted in FIG. 17A, that may be used to contain and/or implement the program instructions of system embodiments described herein. A bus 1752 may serve as the information highway interconnecting the other illustrated components of the hardware. A processing system 1754 labeled CPU (central processing unit) (e.g., one or more computer processors), may perform calculations and logic operations required to execute a program. A processor-readable storage medium, such as read only memory (ROM) 1756 and random access memory (RAM) 1758, may be in communication with the processing system 1754 and may contain one or more programming instructions for an underlying asset risk monitoring system. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1760 interfaces with one or more optional disk drives to the system bus 1752. These disk drives may be external or internal floppy disk drives such as 1762, external or internal CD-ROM, CD-R, CD-RW or DVD drives such as 1764, or external or internal hard drives 1766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1760, the ROM 1756 and/or the RAM 1758. Preferably, the processor 1754 may access each component as required.

A display interface 1768 may permit information from the bus 1752 to be displayed on a display 1770 in audio, graphic, or alphanumeric format. Communication with external devices may optionally occur using various communication ports 1772.

In addition to the standard computer-type components, the hardware may also include data input devices, such as a keyboard 1773, or other input device 1774, such as a microphone, remote control, pointer, mouse and/or joystick.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results It is claimed:

1. A computer-implemented method, comprising:
   accessing, on a computing device, primary loan observations, wherein the primary loan observations include observations with respect to a primary set of loan variables and provide information about financial conditions of borrowers associated with multiple loans, wherein the variables of the primary set are correlated with default risk;
   accessing, on the computing device, secondary loan observations, wherein the secondary loan observations include observations with respect to a secondary set of loan variables and further provide information about the financial conditions of the borrowers, and wherein the variables of the secondary set are correlated with default risk;
   generating, on the computing device, a handle data structure based on primary loan observations and secondary loan observations, wherein each of a plurality of cells is defined by at least one of an interval with respect to a loan variable of the primary set and an interval with respect to a loan variable of the secondary set;
   individually categorizing each of the loans, wherein categorizing a loan includes associating the loan with one of the cells such that loans associated with a similar default risk are assigned to same cells, and wherein each of the individual categorizations is performed on the computing device and is based on one of the primary loan observations, one of the secondary loan observations, and the intervals that define the cells;
   generating a plurality of asset tranches such that each of the asset tranches is associated with at least one of the cells, and wherein at least one of the asset tranches includes a composite loan including two or more loans;
   determining that at least one of the loans is a changed loan, wherein a changed loan is a loan associated with a changed level of default risk, and wherein determining includes detecting changes in at least one of primary loan observations and secondary loan observations;
   reclassifying at least one of the changed loans by determining a new cell association based on changes in at least one of primary loan observations and secondary loan observations;
   monitoring trends associated with changes in default risk of the loans;
   making handle data structure modifications based on the detected changes; and
   generating one or more reports based on the monitored trends.

2. The method of claim 1, further comprising:
   determining a risk factor for each of the plurality of asset tranches, the risk factor characterizing an estimate of a risk associated with investing in the asset tranche.

3. The method of claim 1, wherein the primary set of loan variables includes a borrower character metric, a payment capacity metric, a capital metric, loan collateral, or a metric identifying borrower vulnerability to future market conditions and terms of a loan agreement.

4. The method of claim 1, wherein the secondary set of loan variables includes a number of years a borrower has lived at a current address, a number of years a borrower has worked in a profession, a banking relationship metric, or a co-applicant credit score.

5. The method of claim 1, wherein generating the asset tranches includes:
   ranking each of the cells based on a risk of default of the loans in the cells; and
   defining each of the plurality of asset tranches based on the ranking.

6. The method of claim 5, further comprising:
   classifying loan portfolios into different groups for providing risk ratings, wherein the loan portfolios are classified based on the ranking of the cells.

7. The method of claim 1, further comprising:
   ranking each of the plurality of asset tranches according to a composite riskiness of one or more of the cells.

8. The method of claim 1, further comprising generating a mortgage backed security or collateralized debt obligation using a plurality of loans from a single one of the plurality of asset tranches.

9. The method of claim 1, wherein the one or more reports are configured to facilitate strategic portfolio development of at least one of the loans.

10. A system, comprising:
one or more data processors; and
one or more non-transitory computer-readable storage media including instructions configured to cause the one or more processors to perform operations including:
accessing primary loan observations, wherein the primary loan observations include observations with respect to a primary set of loan variables and provide information about financial conditions of borrowers associated with multiple loans, wherein the variables of the primary set are correlated with default risk;
accessing secondary loan observations, wherein the secondary loan observations include observations with respect to a secondary set of loan variables and further provide information about the financial conditions of the borrowers, and wherein the variables of the secondary set are correlated with default risk;
generating a handle data structure based on primary loan asset observations and secondary loan observations, wherein each of a plurality of cells is defined by an interval with respect to at least one of a loan variable of the primary set and an interval with respect to a loan variable of the secondary set;
individually categorizing each of the loans, wherein categorizing a loan includes associating the loan with one of the cells such that loans associated with a similar default risk are assigned to same cells, and wherein each of the individual categorizations is based on one of the primary loan observations, one of the secondary loan observations, and the intervals that define the cells;
generating a plurality of asset tranches such that each of the asset tranches is associated with at least one of the cells, and wherein at least one of the asset tranches includes a composite loan including two or more loans;
determining that at least one of the loans is a changed loan, wherein a changed loan is a loan associated with a changed level of default risk, and wherein determining includes detecting changes in at least one of primary loan observations and secondary loan observations;
reclassifying at least one of the changed loans by determining a new cell association based on changes in at least one of primary loan observations and secondary loan observations;
monitoring trends associated with changes in default risk of the loans;
making handle data structure modifications based on the detected changes; and
generating one or more reports based on the monitored trends.

11. The system of claim 10, wherein the operations further include:
determining a risk factor for each of the plurality of asset tranches, the risk factor characterizing an estimate of a risk associated with investing in the asset tranche.

12. The system of claim 10, wherein the primary set of loan variables includes a borrower character metric, a payment capacity metric, a capital metric, loan collateral, or a metric identifying borrower vulnerability to future market conditions and terms of a loan agreement.

13. The system of claim 10, wherein the secondary set of loan variables includes a number of years a borrower has lived at a current address, a number of years a borrower has worked in a profession, a banking relationship metric, or a co-applicant credit score.

14. The system of claim 10, wherein generating the asset tranches includes:
ranking each of the cells based on a default risk of the loans in the cells; and
defining each of the plurality of asset tranches based on the ranking.

15. The system of claim 14, wherein the operations further include:
classifying loan portfolios into different groups for providing risk ratings, wherein the loan portfolios are classified based on the ranking of the cells.

16. The system of claim 10, wherein the operations further include:
ranking each of the plurality of asset tranches according to a composite riskiness of one or more of the cells.

17. The system of claim 10, wherein the operations further include:
generating a mortgage backed security or collateralized debt obligation using a plurality of loans from a single one of the plurality of asset tranches.

18. The system of claim 10, wherein the one or more reports are configured to facilitate strategic portfolio development of at least one of the loans.

19. A computer-program product tangibly embodied in a non-transitory machine readable storage medium, the storage medium including instructions configured to cause a data processing apparatus to:
accessing primary loan observations, wherein the primary loan observations include observations with respect to a primary set of loan variables and provide information about financial conditions of borrowers associated with multiple loans, wherein the variables of the primary set are correlated with default risk;
accessing secondary loan observations, wherein the secondary loan observations include observations with respect to a secondary set of loan variables and further provide information about the financial conditions of the borrowers, and wherein the variables of the secondary set are correlated with default risk;
generating a handle data structure based on primary loan asset observations and secondary loan observations, wherein each of a plurality of cells is defined by an interval with respect to at least one of a loan variable of the primary set and an interval with respect to a loan variable of the secondary set;
individually categorizing each of the loans, wherein categorizing a loan includes associating the loan with one of the cells such that loans associated with a similar default risk are assigned to same cells, and wherein each of the individual categorizations is based on one of the primary loan observations, one of the secondary loan observations, and the intervals that define the cells;
generating a plurality of asset tranches such that each of the asset tranches is associated with at least one of the cells, and wherein at least one of the asset tranches includes a composite loan including two or more loans;
determining that at least one of the loans is a changed loan, wherein a changed loan is a loan associated with a changed level of default risk, and wherein determining includes detecting changes in at least one of primary loan observations and secondary loan observations;

reclassifying at least one of the changed loans by determining a new cell association based on changes in primary loan observations or secondary loan observations;

monitoring trends associated with changes in default risk of the loans;

making handle data structure modifications based on the detected changes; and generating one or more reports based on the monitored trends.

20. The computer-program product of claim 19, further including instructions configured to cause the data processing apparatus to:

determine a risk factor for each of the plurality of asset tranches, the risk factor characterizing an estimate of a risk associated with investing in the asset tranche.

21. The computer-program product of claim 19, wherein the primary set of loan variables includes a borrower character metric, a payment capacity metric, a capital metric, loan collateral, or a metric identifying borrower vulnerability to future market conditions and terms of a loan agreement.

22. The computer-program product of claim 19, wherein the secondary set of loan variables includes a number of years a borrower has lived at a current address, a number of years a borrower has worked in a profession, a banking relationship metric, or a co-applicant credit score.

23. The computer-program product of claim 19, wherein the storage medium further includes instructions configured to cause the data processing apparatus to:

rank each of the cells based on default risk of loans in the cells; and define each of the plurality of asset tranches based on the ranking.

24. The computer-program product of claim 23, further including instructions configured to cause a data processing apparatus to:

classify loan portfolios into different groups for providing risk ratings, wherein the loan portfolios are classified based on the ranking of the cells.

25. The computer-program product of claim 19, further including instructions configured to cause the data processing apparatus to:

rank each of the plurality of asset tranches according to a composite riskiness of one or more of the cells.

26. The computer-program product of claim 19, further including instructions configured to cause the data processing apparatus to:

generate a mortgage backed security or collateralized debt obligation using a plurality of loans from a single one of the plurality of asset tranches.

27. The computer-program product of claim 19, wherein the one or more reports are configured to facilitate strategic portfolio development of at least one of the loans.

* * * * *